(12) United States Patent
Avantaggiati et al.

(10) Patent No.: US 11,125,580 B1
(45) Date of Patent: Sep. 21, 2021

(54) MEMS SENSOR MODULATION AND MULTIPLEXING

(71) Applicant: INVENSENSE, INC., San Jose, CA (US)

(72) Inventors: Vito Avantaggiati, Rome (IT); Adolfo Giambastiani, San Marco (IT)

(73) Assignee: InvenSense, Inc., San Jose, CA (US)

( * ) Notice: Subject to any disclaimer, the term of this patent is extended or adjusted under 35 U.S.C. 154(b) by 0 days.

(21) Appl. No.: 16/874,418

(22) Filed: May 14, 2020

(51) Int. Cl.
*G01C 19/5712* (2012.01)
*G01C 25/00* (2006.01)

(52) U.S. Cl.
CPC ......... *G01C 25/00* (2013.01); *G01C 19/5712* (2013.01)

(58) Field of Classification Search
CPC .............................. G01C 19/5712; G01C 25/00
See application file for complete search history.

(56) References Cited

U.S. PATENT DOCUMENTS

| | | | |
|---|---|---|---|
| 7,417,511 B2 | 8/2008 | Menke | |
| 7,429,904 B2 | 9/2008 | Trutna et al. | |
| 7,458,263 B2* | 12/2008 | Nasiri | G01C 19/56 73/493 |
| 8,996,919 B2* | 3/2015 | Gao | G06F 11/2273 714/35 |
| 9,238,580 B2 | 1/2016 | Alagarsamy et al. | |
| 9,714,842 B2* | 7/2017 | Anac | G01C 19/5712 |
| 2010/0145660 A1* | 6/2010 | Lang | G01D 3/08 702/193 |
| 2010/0294039 A1* | 11/2010 | Geen | G01C 19/5776 73/504.12 |
| 2011/0041609 A1* | 2/2011 | Clark | G01C 19/5712 73/514.29 |
| 2014/0250969 A1* | 9/2014 | Alagarsamy | B81C 99/005 73/1.01 |
| 2016/0356820 A1* | 12/2016 | Ausserlechner | G01R 15/202 |
| 2017/0023364 A1* | 1/2017 | Gregory | G01P 15/13 |
| 2017/0146364 A1* | 5/2017 | Aaltonen | G01P 15/125 |
| 2017/0167873 A1* | 6/2017 | Coronato | G01C 19/5776 |
| 2017/0284803 A1* | 10/2017 | Andersson | G01C 19/574 |
| 2018/0128674 A1* | 5/2018 | Kook | G01H 13/00 |
| 2019/0063923 A1* | 2/2019 | Yan | G01C 19/5726 |

* cited by examiner

*Primary Examiner* — David J Bolduc
(74) *Attorney, Agent, or Firm* — Haley Guiliano LLP; Joshua V. Van Hoven; Stefan D. Osterbur

(57) ABSTRACT

A MEMS inertial sensor may include drive electrodes that apply a drive signal to a suspended spring-mass system for measurement of an inertial linear or angular force and self-test electrodes that apply a self-test signal to the suspended spring-mass system for monitoring the characteristics of the suspended spring-mass system during operation. The self-test signal may be modulated by a spreading sequence that prevents interference with the self-test signal by vibrations and other disturbance signals. The self-test signals and drive signals may be modulated with CDMA code sequences to multiplex signals that are at least partially processed by a common sense path.

25 Claims, 11 Drawing Sheets

MEMS SENSOR MODULATION AND MULTIPLEXING

BACKGROUND

Numerous items such as smartphones, smart watches, tablets, automobiles, aerial drones, appliances, aircraft, exercise aids, and game controllers utilize sensors during their operation (e.g., motion sensors, pressure sensors, temperature sensors, etc.). In commercial applications, microelectromechanical (MEMS) sensors such as accelerometers and gyroscopes capture complex movements and determine orientation or direction. For example, smartphones are equipped with accelerometers and gyroscopes to understand the movement of the smartphone, to augment navigation systems that rely on Global Position System (GPS) information, and to perform numerous other functions. Wearable devices and internet-of-things (IoT) devices constantly measure movement and other characteristics of a person, animal, or electronic device. In another example, drones and aircraft determines orientation based on gyroscope measurements (e.g., roll, pitch, and yaw) and vehicles of all types implement assisted driving to improve safety (e.g., to recognize skid or roll-over conditions).

MEMS sensors such as MEMS inertial sensors may have an extensive useful product life in a broad variety of environments and applications. Components of MEMS sensors such as springs, proof masses, electrodes, and processing circuitry may experience wear or other changes over time, such that the operation of the sensor (e.g., sensitivity, offsets, scaling, and other parameters) changes over time. At some point, the changes may be such that compensation techniques are applied to the MEMS sensor to maintain normal operation. More significant changes may require warnings or errors (e.g., under conditions required by an end-use product), or may even be indicative of MEMS sensor failure. A variety of monitoring techniques may be utilized to monitor MEMS sensor performance over the life of the MEMS sensor. Some of these techniques involve the injection of test signals into components of the MEMS sensor and analysis of MEMS sensor performance based on changes in the test signal. These methods may be subject to a variety of sources of interference, or may cause interference with other measured signals for the sensor.

SUMMARY

In some embodiments of the present disclosure, a microelectromechanical (MEMS) inertial sensor comprises at least one proof mass configured to move in response to an inertial linear or angular force and to provide a sense signal, at least one drive electrode, and drive circuitry coupled to the at least one drive electrode to apply a drive signal to the at least one proof mass via the at least one drive electrode, wherein the sense signal is based on the drive signal and the movement of the at least one proof mass. The MEMS inertial sensor may further comprise at least one self-test electrode and self-test circuitry coupled to the at least one self-test electrode to apply a spread spectrum self-test signal to the at least one self-test electrode, wherein the self-test signal is at least partially transmitted through the at least one proof mass to generate a monitor signal. The MEMS inertial sensor may further comprise at least one sense electrode configured to receive a combined signal comprising the sense signal and the monitor signal from the at least one proof mass and processing circuitry coupled to the at least one sense electrode, wherein the processing circuitry is configured to identify the sense signal from the combined signal based on one or more characteristics of the drive signal, identify the monitor signal from the combined signal based on one or more characteristics of the spread spectrum self-test signal, determine a measure of the inertial linear or angular force for the MEMS inertial sensor based on the identified sense signal, and modify the measure of the inertial linear or angular force based on the identified monitor signal.

In some embodiments of the present disclosure, a method for performing a self-test for a microelectromechanical (MEMS) inertial sensor comprises providing, from drive circuitry to at least one proof mass, a drive signal, wherein a sense signal is based on the drive signal and a movement of the at least one proof mass in response to an inertial linear or angular force. The method may further comprise providing, from self-test circuitry to the at least one proof mass, a spread spectrum self-test signal, wherein the self-test signal is at least partially transmitted through the at least one proof mass to generate a monitor signal. The method may further comprise receiving, from the at least one proof mass by at least one sense electrode, a combined signal comprising the sense signal and the monitor signal. The method may further comprise identifying the sense signal from the combined signal based on one or more characteristics of the drive signal, identifying the monitor signal from the combined signal based on one or more characteristics of the spread spectrum self-test signal, determining a measure of the inertial linear or angular force based on the identified sense signal, and modifying the measure of the inertial linear or angular force based on the identified monitor signal.

In some embodiments of the present disclosure, a method for identifying an error in a sensitivity of a microelectromechanical (MEMS) MEMS inertial sensor comprises applying, from a first signal source, a drive signal to at least one proof mass, and applying, from second signal source, a code division multiple access (CDMA) self-test signal to the at least one proof mass, wherein the first signal source generates the drive signal independently from the second signal source generating the self-test signal. The method may further comprise receiving, by at least one sense electrode associated with the at least one proof mass, a combined signal comprising a sense channel that is based on the drive signal and an inertial linear or angular force that causes movement of the at least one proof mass and a monitor channel that is based on the self-test signal. The method may further comprise extracting a sense signal associated with the sense channel from the combined signal based on a frequency of drive signal, extracting a monitor signal associated with the monitor channel based on a CDMA code associated with the spread spectrum self-test signal, quantifying the inertial linear or angular force based on the sense signal, and determining a sensitivity for the MEMS inertial sensor based on the monitor signal.

BRIEF DESCRIPTION OF THE DRAWINGS

The above and other features of the present disclosure, its nature, and various advantages will be more apparent upon consideration of the following detailed description, taken in conjunction with the accompanying drawings in which.

DETAILED DESCRIPTION OF THE DRAWINGS

Figure 1:
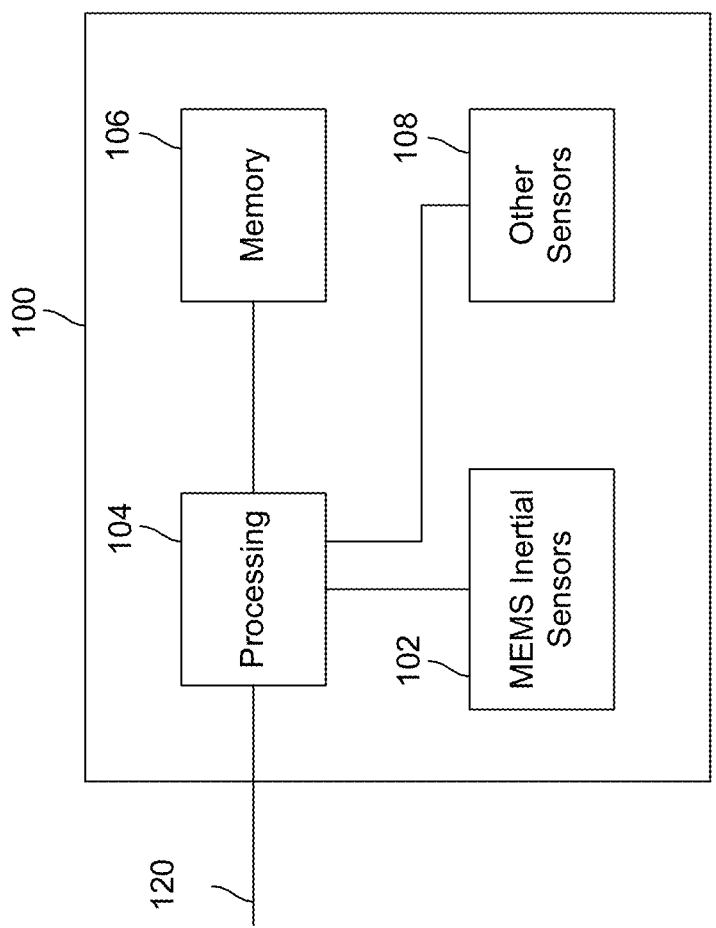
FIG. 1 depicts an exemplary motion sensing system in accordance with some embodiments of the present disclosure.

A MEMS sensor such as a MEMS inertial sensor may measure a force of interest (e.g., an inertial force such as linear acceleration or angular velocity) based on movement of portions of a MEMS layer (e.g., proof masses of a suspended spring-mass system of the MEMS layer) of the sensor. The movements of the MEMS layer components may be measured according to a variety of methods (e.g., capacitive sensing) and may be based at least in part on a drive signal that is provided to the MEMS layer components such as by drive electrodes. In exemplary embodiments of MEMS inertial sensors, the drive signal may by electrically and/or mechanically transmitted through the MEMS layer components such that it is modulated based at least in part on the movement of the MEMS layer components in response to the force of interest. The resulting signal is sensed by sense electrodes and processed by sense circuitry to determine measurements of force of interest.

A self-test signal may also be applied to the MEMS layer components via self-test electrodes. The self-test circuitry may generate the self-test signal according to modulation techniques that limit the possibility of the self-test signal being interfered with by disturbances experienced by the MEMS layer components such as vibrations experienced by the suspended spring-mass system. A spreading sequence may be utilized to modulate the self-test signal before it is applied to the MEMS layer components by the self-test electrodes, and a delayed version is later applied to demodulate a monitor signal (e.g., corresponding to the self-test signal as modified by the MEMS components) received by sense electrodes of the MEMS sensor. This demodulation may spread any disturbance such as vibrations experienced by the MEMS components while recovering the monitor signal. The recovered monitor signal may then be used to compensate for changes to sensor sensitivity and identify errors such as damage to the MEMS components.

The self-test circuitry may generate the self-test signal in a manner that limits interference of the self-test signal with the MEMS drive signal during sensor operation, allowing simultaneous operation and testing of the MEMS sensor in some instances. The self-test signal and the drive signal may each be modulated by a signal patterns such as respective CDMA code sequences having a minimum scalar product (e.g., orthogonal). The combined signal received by the sense electrodes includes both a monitor signal associated with the CDMA and spread spectrum modulated self-test signal (e.g., as modified by propagation through the suspended spring-mass system of the MEMS sensor) and a sense signal associated with the CDMA modulated drive signal (e.g., as modified by a sensed inertial force), which are at least partially processed through common sense circuitry such as capacitance-to-voltage ("C2V") conversion circuitry, a mixer/demodulator, and analog-to-digital conversion circuitry. The portions of the combined signal may then be individually processed based on demodulation by their respective CDMA code sequences. In some embodiments, different CDMA signals may be applied to each of a plurality of MEMS sensors that share a common sense path (e.g., respective x-axis, y-axis, and z-axis MEMS inertial sensors) such that each of the respective sense signals and the monitor signals are at least partially processed by common sense circuitry before undergoing further processing after demodulation based on the respective orthogonal CDMA modulation of the drive and self-test signals.

FIG. 1 depicts an exemplary motion sensing system 100 in accordance with some embodiments of the present disclosure. Although particular components are depicted in FIG. 1, it will be understood that other suitable combinations of sensors, processing components, memory, and other circuitry may be utilized as necessary for different applications and systems. In an embodiment as described herein, the motion sensing system may include at least a MEMS inertial sensor 102 (e.g., a single- or multi-axis accelerometer for measuring linear acceleration along one or more axes or a single- or multi-axis gyroscope for measuring angular velocity about one or more axes) and supporting circuitry, such as processing circuitry 104 and memory 106. In some embodiments, one or more additional sensors 108 (e.g., MEMS gyroscopes, MEMS accelerometers, MEMS microphones, MEMS pressure sensors, and a compass) may be included within the motion processing system 100 to provide an integrated motion processing unit ("MPU") (e.g., including 3 axes of MEMS gyroscope sensing, 3 axes of MEMS accelerometer sensing, microphone, pressure sensor, and compass).

Processing circuitry 104 may include one or more components providing necessary processing based on the requirements of the motion processing system 100. In some embodiments, processing circuitry 104 may include hardware control logic that may be integrated within a chip of a sensor (e.g., on a substrate or cap of a MEMS inertial sensor 102 or other sensor 108, or on an adjacent portion of a chip to the MEMS inertial sensor 102 or other sensor 108) to control the operation of the MEMS inertial sensor 102 or other sensors 108 and perform aspects of processing for the MEMS inertial sensor 102 or other sensors 108. In some embodiments, the MEMS inertial sensor 102 and other sensors 108 may include one or more registers that allow aspects of the operation of hardware control logic to be modified (e.g., by modifying a value of a register). In some embodiments, processing circuitry 104 may also include a processor such as a microprocessor that executes software instructions, e.g., that are stored in memory 106. The microprocessor may control the operation of the MEMS inertial sensor 102 by interacting with the hardware control logic, and process signals received from MEMS inertial sensor 102. The microprocessor may interact with other sensors in a similar manner.

Although in some embodiments (not depicted in FIG. 1), the MEMS inertial sensor 102 or other sensors 108 may communicate directly with external circuitry (e.g., via a serial bus or direct connection to sensor outputs and control inputs), in an embodiment the processing circuitry 104 may process data received from the MEMS inertial sensor 102 and other sensors 108 and communicate with external components via a communication interface 120 (e.g., a SPI or I2C bus, in automotive applications a controller area network (CAN) or Local Interconnect Network (LIN) bus, or in other applications suitable wired or wireless communications interfaces as is known in the art). The processing circuitry 104 may convert signals received from the MEMS inertial sensor 102 and other sensors 108 into appropriate measurement units (e.g., based on settings provided by other computing units communicating over the communication bus 120) and perform more complex processing to determine measurements such as orientation or Euler angles, and in some embodiments, to determine from sensor data whether a particular activity (e.g., walking, running, braking, skidding, rolling, etc.) is taking place. In some embodiments, some or all of the conversions or calculations may take place on the hardware control logic or other on-chip processing of the MEMS inertial sensor 102 or other MEMS sensors 108.

In some embodiments, certain types of information may be determined based on data from multiple MEMS inertial sensors 102 and other sensors 108, in a process that may be referred to as sensor fusion. By combining information from a variety of sensors it may be possible to accurately determine information that is useful in a variety of applications, such as image stabilization, navigation systems, automotive controls and safety, dead reckoning, remote control and gaming devices, activity sensors, 3-dimensional cameras, industrial automation, and numerous other applications.

The MEMS inertial sensor 102 and/or other sensors 108 may include self-test and monitoring circuitry and procedures for measuring and analyzing aspects of the operation of the sensors. Exemplary monitoring may include (e.g., as processing circuitry) self-test drive circuitry that generates self-test signals that are applied to components of the MEMS inertial sensor, for example, to perform a device self-test and/or compensation procedure. Self-test signals may include particular modulation patterns to avoid interference with MEMS inertial sensor operation or confusion with other signals (e.g., external vibrations) that may be coupled to or produced by the MEMS inertial sensor. The self-test signal may be transmitted via the components of the MEMS inertial sensor, such that changes to the self-test signal may be evidenced in a monitor signal (e.g., the self-test signal as modulated by the MEMS components) that is indicative of the condition and/or operations of the MEMS inertial sensor. The received signal from the MEMS components may include the monitor signal, which may be extracted and analyzed for monitoring, compensation, self-test, and other aspects of sensor operation.

In an exemplary MEMS inertial sensor, drive circuitry may provide drive signals to the suspended spring-mass system. For example, in a MEMS gyroscope a drive signal may create a physical drive motion of one or more components (e.g., drive masses) that in turn results in a Coriolis force experienced by proof masses when the gyroscope is rotated about an axis of interest. Drive circuitry may also transmit electrical signals having particular characteristics to proof masses of a gyroscope or accelerometer for modulation and multiplexing of measured output signals from the proof masses. Whether the signal provided by drive circuitry causes movement of drive masses, transmits a signal to proof masses (e.g., via other components of the suspended spring-mass system), or both, in an exemplary embodiment the drive circuitry may provide the drive signal via one or more drive electrodes (e.g., a capacitive plate, comb electrode, etc.) located adjacent to components of the suspended spring-mass system (e.g., drive masses, proof masses, etc.). Drive electrodes that are used to transmit self-test driving signals may be referred to as self-test electrodes herein, while the drive circuitry that supplies the self-test signals may be referred to as self-test circuitry herein.

In some embodiments, a self-test signal may cause a physical motion of one or more components of the suspended spring-mass system (e.g., drive masses, proof masses, or other components) with a known signal (e.g., corresponding to a particular expected force) to monitor a response of the components to that known signal via direct or indirect movements of the proof masses. Self-test circuitry may also transmit electrical signals having particular characteristics to proof masses of a gyroscope or accelerometer for modulation and multiplexing of measured output signals from the proof masses. Whether the signal provided by self-test circuitry causes movement of components of the suspended spring-mass system, transmits signals via the proof masses (e.g., via other components of the suspended spring-mass system), or both, in an exemplary embodiment the self-test circuitry may provide the self-test signal via one or more self-test electrodes (e.g., a capacitive plate, comb electrode, etc.) located adjacent to components of the suspended spring-mass system (e.g., drive masses, proof masses, etc.). Exemplary configurations of self-test electrodes, self-test circuitry, and self-test signals are depicted and described in U.S. Pat. No. 10,088,315, entitled "TWO FREQUENCY GYROSCOPE COMPENSATION SYSTEM AND METHOD" and issued on Oct. 2, 2019, which is hereby incorporated by reference in its entirety. In some exemplary embodiments described herein, drive signals and self-test signals may be modulated with spread spectrum and/or code division multiple access (CDMA) techniques.

Figure 2:
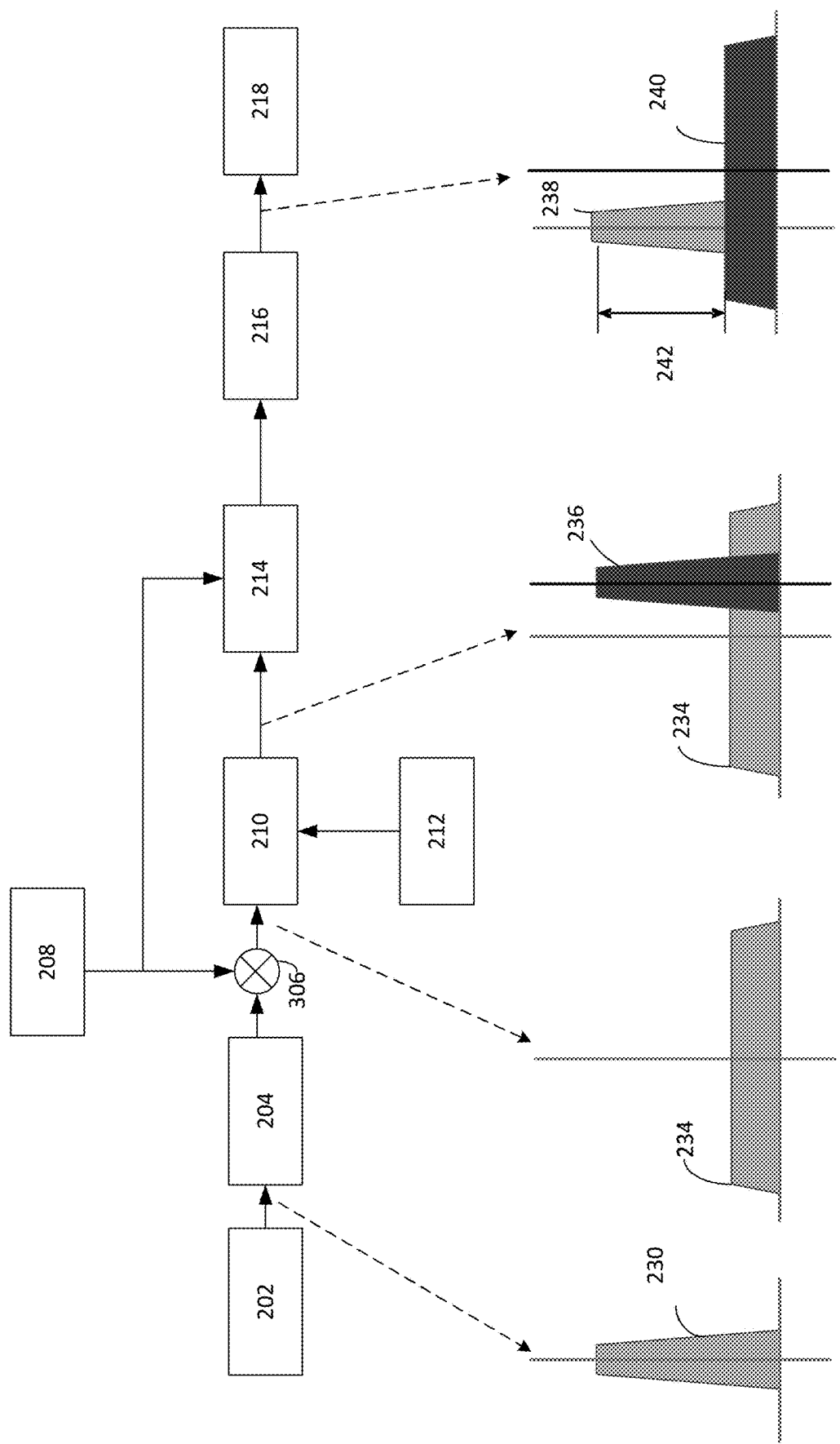
FIG. 2 depicts exemplary spread spectrum sensor modulation and demodulation and related disturbance suppression of a MEMS inertial sensor in accordance with some embodiments of the present disclosure.

FIG. 2 depicts exemplary spread spectrum sensor modulation and demodulation and related disturbance suppression of a MEMS inertial sensor in accordance with some embodiments of the present disclosure. In the exemplary embodiment in FIG. 2, an exemplary spread spectrum signal is applied to a MEMS sensor that is also experiencing an interfering external vibration. As described herein, a procedure may be performed by applying a spread spectrum signal to a suspended spring-mass system of a MEMS inertial sensor. It may be desirable for the MEMS signal to be robust to interfering signals such as external vibrations. In the exemplary embodiment of FIG. 2, a spread spectrum signal may be applied to MEMS electrodes and an external vibration may also be experienced by the MEMS inertial sensor. The upper portion of FIG. 2 corresponds to a signal path for the MEMS signal and vibration signal, while the bottom portion of FIG. 2 depicts the MEMS signal and vibration signals at different stages of the signal path.

Spread spectrum is a technique used in telecommunications to improve robustness against narrowband interferers. An underlying transmitted signal is spread to occupy a desired portion of the frequency spectrum available for transmission. By using spread spectrum modulation and demodulation techniques, interference with or by other signals (e.g., vibrations and other disturbance signals) may be avoided, improving the robustness of the transmission, reception, use and monitoring of the transmitted signal. In some embodiments of the disclosure, signals such as drive signals and/or self-test signals are modulated by a suitable spreading sequence (e.g., a pseudo-noise sequence, a chirp, or other wideband signals, analog or digital, having a detectable signature) to generate a spread spectrum signal which is transmitted over the transmission medium (e.g., in the context of a MEMS inertial sensor, the suspended spring-mass system and associated sensing circuitry). The disturbance (e.g., narrowband vibrations or interferers) that are experienced by the transmission medium are also received by the transmission medium, but do not effectively interfere with the spread spectrum signal. Further, when sense circuitry demodulates the spread spectrum signal (e.g., utilizing the despreading sequence necessary to demodulate the original transmission signal), the interferer signal may be modified by that demodulation, such that the interfering disturbance signal is spread throughout the frequency range of the spread bandwidth, decreasing its spectral density, while the intended signal is recovered on its original narrower band, increasing its spectral density.

In an embodiment of the present disclosure, a transmit signal is generated by a transmitter 202, such as drive or sense circuitry or self-test circuitry of a MEMS inertial sensor. The transmit signal includes baseband information that may be modulated at a transmit frequency and has a bandwidth about that frequency (e.g., where such frequency may be 0 Hz or another higher frequency), as depicted by transmit signal 230. The transmit signal 230 undergoes pre-processing 204 to prepare the transmit signal for spreading, for example, by applying 1:N zero order hold up-sampling to the transmit signal 230.

A spreading sequence such as a N tap pseudo-noise sequence is generated (e.g., by processing circuitry such as self-test circuitry) at 208 and is applied to the pre-processed transmit signal at mixer 204 up-sampled by N. In this manner, the spreading sequence spreads the underlying data in a generally uniform manner about the original modulation frequency, as depicted by spread spectrum transmit signal 234, which is a spread version of transmit signal 230, spreading the transmission bandwidth by a factor N. Spreading the signal over a wide region of the spectrum, instead of allocating it at predefined frequencies, gives the signal a low spectral density and higher resistance to interference having a bandwidth narrower than the spread bandwidth.

The spread spectrum transmit signal 234 is then supplied to the transmission medium 210. An interference source 212 denotes an external force (e.g., electrical, mechanical, magnetic, etc.) that is applied to the transmission medium while the spread spectrum transmit signal is also applied to the transmission medium. An interference signal 236 from the interference source 212 is thus also carried on the transmission medium with the spread spectrum transmit signal 234. Although not depicted in FIG. 2, the spread spectrum transmit signal may be modulated by a source of force, for example, by a linear acceleration, an angular velocity, or an electrostatic force having a magnitude and frequency to be sensed by sense circuitry.

The spreading sequence generated by processing circuitry 208 is also provided to demodulation circuitry 214 (e.g., a N taps correlator, where N corresponds to the up-sampling applied at pre-processor 204 and the to the samples of the spreading sequence). This demodulation circuitry 214 applies the despreading sequence to the combined output signal (e.g., by correlation) of transmission medium 210 (e.g., including spread spectrum transmit signal 234 and vibration signal 236), and the output is further processed by post-processor 216. At post-processor 216, the demodulated signals are post-processed in a manner that corresponds with the pre-processing 204 (e.g., down sampled by a N:1 down sampler 216). By using the same spreading sequence and processing applied to the transmit signal 200, an output signal 238 (e.g., the transmit signal 230 as modified by the transmission medium 210) can be recovered on its original band. Because the same processing is also applied to the interference signal 236, the de-spreading operation for spread spectrum transmit signal 234 operates as a spreading operation for the interference signal 236, resulting in a spread spectrum interference signal 240. Although there may be some frequency overlap between the spread spectrum interference signal 240 and the output signal 238, the signal content of the output signal 238 at and about the transmit frequency is substantially greater than the signal content of the spread spectrum interference signal 240, such that the interference signal content at and about the transmit frequency of the original transmit signal can be disregarded and/or removed to allow clean processing of the output signal 238.

The signal-to-noise ratio associated with an interference signal (e.g. an interference signal such as interference signal 236) is significantly reduced by utilizing the spread spectrum modulation/demodulation scheme described herein. As is depicted in FIG. 2, the relative magnitude of the interference signal 236 may be comparable to that of transmit signal 230 and output signal 208. Depending upon the frequency and bandwidth of interference signal 236, without the modulation/demodulation techniques described herein, it is possible that the interference signal 236 would interfere with the extraction of information (e.g., from the original transmit signal 230 or from changes applied to the transmit signal by a transmission medium 210 such as a MEMS inertial signal) from the output signal 238. However, a spreading sequence of length N improves the final signal-to-noise ratio based on the fact that the overall energy of the signals is the same during spreading/de-spreading processes. The processing gain for a spreading sequence of length N is calculated as follows:

$$PG_{linear} = \sqrt{N}$$

$$PG_{dB} = 10 * \log_{10}(N)$$

Figure 3:
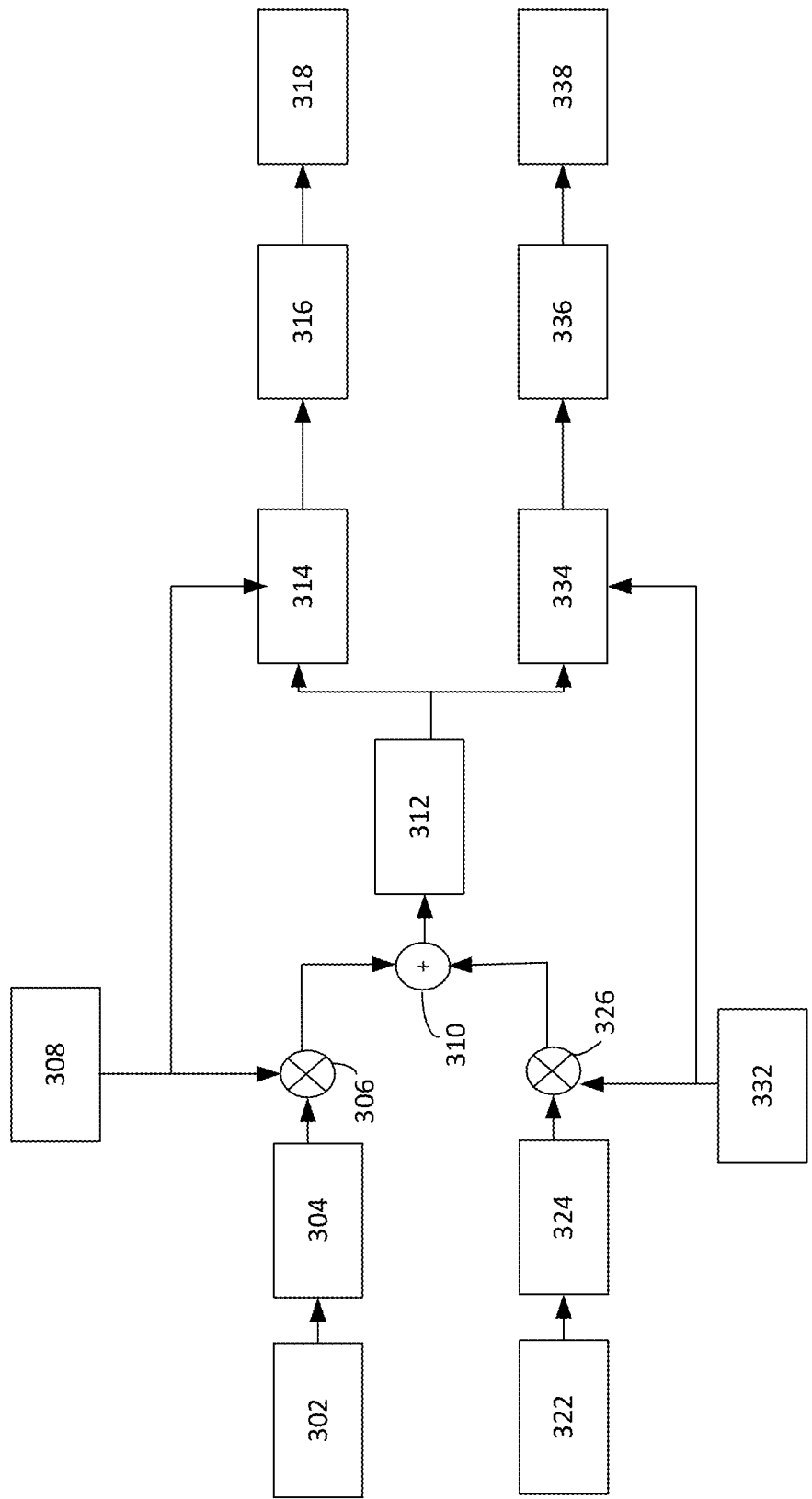
FIG. 3 depicts exemplary CDMA modulation and demodulation in accordance with some embodiments of the present disclosure.

FIG. 3 depicts exemplary CDMA modulation and demodulation in accordance with some embodiments of the present disclosure. In the exemplary embodiment in FIG. 3, a plurality of CDMA modulated signals are transmitted over and extracted from a common transmission medium. CDMA techniques can allocate many signals within the same bandwidth using orthogonal coding (e.g., $4^{th}$ order Walsh-Hadamard codes, Gold codes, Golay codes, etc.). For example, an exemplary Walsh-Hadamard set of orthogonal codes of length 4, $H_4$, may be represented as follows:

$$H_4 = \begin{bmatrix} C_0 \\ C_1 \\ C_2 \\ C_3 \end{bmatrix} = \begin{bmatrix} +1 & +1 & +1 & +1 \\ +1 & -1 & +1 & -1 \\ +1 & +1 & -1 & -1 \\ +1 & -1 & -1 & +1 \end{bmatrix}$$

where orthogonality is expressed as:

$$\frac{1}{N}\sum_{n=0}^{N-1} C_k(n)C_h(n) = \begin{cases} 0, & \text{if } k \neq h \\ 1, & \text{if } k = h \end{cases}$$

For example, an input signal x(j), may be modulated by an orthogonal code per the formula below, and may be recovered on the receive side using the same code that was used to modulate the signal:

$$y(Nj+n) = C_h(n)x(j);$$

j=0, 1, 2, 3, . . . ,
n=0, 1, . . . , N−1.

In some embodiments of the present disclosure, orthogonal codes such as Walsh Codes may be utilized for modulating multiple signals to be transmitted over a shared transmission medium and bandwidth. For example, codes used for CDMA encoding may correspond to lines of a Hadamard matrix. For a set of Walsh codes of length N, the matrix may include N lines to form a square matrix of N×N Walsh codes, with each line of the matrix corresponding to a channel. The Walsh codes may have strong autocorrelation qualities and zero cross-correlation according to previous formulas, and may identify the data for each individual channel by leveraging this orthogonality property.

In an exemplary embodiment of CDMA in a MEMS inertial sensor, a first transmit signal (e.g., corresponding to a signal supplied for a first axis of MEMS inertial sensing) is generated by a first transmitter 302 and a second transmit signal (e.g., corresponding to a signal supplied for a second axis of MEMS inertial sensing) is generated by a second transmitter 322. Each of the transmit signals may be provided to respective pre-processors 304 and 324. For example, exemplary pre-processing may include a 1:N zero order hold up-sampler to prepare samples of the respective transmit signals for modulation by appropriate N-tap CDMA codes.

CDMA code generators 308 and 332 (or in some embodiments, a single code generator providing different codes) may generate respective orthogonal codes for modulation of the respective pre-processed transmit signals at mixers 306 and 326. Exemplary code generators 308 and 332 (e.g., N-taps CDMA Code A generators,) provide the signals to the respective coders 306 and 326 to generate CDMA-coded transmit signals. The CDMA-coded transmit signals output from coders 306 and 326 are combined into a single transmission path at adder 310 to be transmitted over a common transmission medium 312 (e.g., a single MEMS inertial sensor, multiple MEMS inertial sensors, common sense circuitry, or the like).

The output of the common transmission medium 312 is provided to respective demodulation circuitry 314 and 334. The CDMA code outputs from the respective CDMA code generators 308 and 332 are also provided to the demodulation circuitry 314 and 334 (e.g., N taps correlators, where N corresponds to the up-sampling applied at pre-processors 304 and 324). This demodulation circuitry 314 and 334 applies the respective CDMA code sequences to the combined output signal (e.g., by correlation) of transmission medium 312 (e.g., including respective CDMA coded signals output from mixes 306 and 326, including any additional signal modulation by the transmission medium 312), and the respective outputs of the correlators 314 and 334 are further processed by respective post-processors 316 and 336. At post-processors 316 and 336, the demodulated signals are post-processed in a manner that corresponds with the pre-processing 304 and 314 (e.g., down sampled by N:1 down samplers 316 and 336). By using the same respective CDMA coding and processing applied to the respective first and second transmit signals, a first output signal 318 corresponds to the original first transmitted signal from first transmitter 302 (as modulated by transmission medium 312) and a second output signal 338 corresponds to the original first transmitted signal from first transmitter 322 (as modulated by transmission medium 312). In this manner, multiple signals can be transmitted over a common transmission medium 312 (including electromechanical portions of the MEMS inertial sensor(s) or sense circuitry of the MEMS inertial sensor(s)) and recovered in substantially the same form as they were transmitted.

Figure 4:
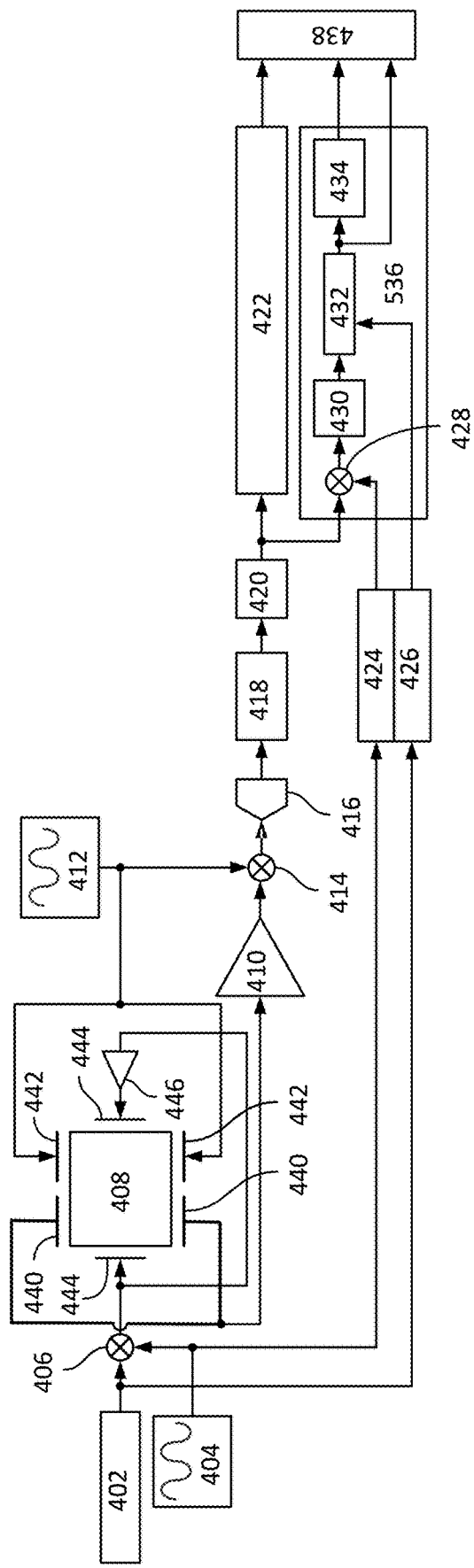
FIG. 4 depicts an exemplary MEMS inertial sensor using spread spectrum signal modulation of a monitor signal in accordance with some embodiments of the present disclosure.

FIG. 4 depicts an exemplary MEMS inertial sensor using spread spectrum signal modulation in accordance with some embodiments of the present disclosure. Although particular components are depicted in FIG. 4 for a particular sensor, it will be understood that some of the components may be modified, removed, or replaced, and that the order of certain operations may be modified while retaining the spread spectrum monitoring features described herein. In an embodiment of the present disclosure, a spreading sequence such as a pseudo noise sequence 402 is generated by self-test circuitry. The spreading sequence 402 (e.g., a pseudo-noise sequence of length N) is provided as an input to mixer 406, and also to monitoring circuitry 436 via a delay element 426. Delay element 426 delays the spreading 402 for an appropriate time (e.g., corresponding to the propagation time of the self-test signal to the monitoring circuitry 436 via the suspended spring-mass system 408 and sense circuitry) to synchronize the spreading sequence modulated onto the self-test and monitor signals received by the monitoring circuitry 436 with the spreading sequence used to demodulate that self-test signal. As is described herein, providing the same spreading sequence to both modulate a self-test signal and later demodulate the monitor signal that is based on that self-test signal allows the self-test signal to monitor the MEMS inertial sensor without interfering with the drive signal or experiencing significant interference from other interference sources such as transient vibrations.

A self-test carrier signal 404 may also be generated by self-test circuitry. The self-test carrier signal 404 may be a periodic signal (e.g., a sinusoidal signal) having a center frequency to be utilized for the self-test signal, which may generally correspond to a frequency that is outside of an operational sensing bandwidth for the MEMS inertial sensor in an exemplary embodiment. The self-test carrier signal 404 is provided as an input to mixer 406, and also to monitoring circuitry 436 via a delay element 424. Delay element 424 delays the self-test carrier signal for an appropriate time (e.g., corresponding to the propagation time of the self-test signal to the monitoring circuitry 436 via the suspended spring-mass system 408 and sense circuitry) to synchronize the phase of the signal received by the monitoring circuitry 436 with the phase of the self-test carrier signal. Mixer 406 modulates the self-test carrier signal 404 with the spreading sequence 402, resulting in a self-test signal that is spread about the frequency of the self-test carrier signal.

The self-test signal is injected to the suspended spring-mass system 408 of the MEMS inertial sensor via self-test electrodes 444, with an inverted version of the self-test signal provided to a portion of the self-test electrodes 444 via an inverter 446. Based on the spreading of the self-test signal, and in some embodiments further based on the selection of the self-test carrier frequency, the self-test signal does not interfere with a drive signal generated by drive circuitry 412 and applied to the suspended spring-mass system 408 via drive electrodes 442. In some embodiments, the choice of the self-test carrier signal may be based on the relationship between the sensitivity of the MEMS inertial sensor at the sensor baseband and the sensitivity of the MEMS inertial sensor at the self-test carrier frequency. The drive signal is also provided to a mixer 414 of the sense circuitry for later demodulation of a combined signal received from the suspended spring-mass system 408 within the sense circuitry.

The self-test signal and the drive signal electrically and/or mechanically propagate through the suspended spring-mass system 408 (e.g., based on the sensor type as a static accelerometer or driven gyroscope, and based on self-test electrode 444 configurations) and are received by sense circuitry (e.g., capacitance to voltage converter 410, mixer 414, analog-to-digital converter 416, decimation circuitry 418, and gain/offset/sensitivity circuitry 420) as a combined monitor signal (e.g., based on the self-test signal) and sense signal (e.g., based on the drive signal) via sense electrodes 440. Capacitances based on the self-test signal, drive signal, and movement of proof masses of the suspended spring-mass system 408 are sensed by sense electrodes 440 and converted into a usable combined signal by capacitance-to-voltage (C2V) converter(s) 410 as a combined signal including both the resulting sense signal and monitor signal. The output from C2Vs 410 is provided to mixer 414, which demodulates the combined signal based on the drive signal, such that a resulting signal that is representative of the baseband sense signal and the spread spectrum monitor signal is provided to analog-to-digital converter 416 and decimation circuitry 418 for conversion into a suitable digital signal. The output from decimation circuitry 418 may be further processed by gain/offset/sensitivity (GOS) correction circuitry 420 to modify the baseband sense signal (e.g., to compensate for known offset or gain effects). Because the spread spectrum monitor signal does not interfere with the baseband sense signal, the sense signal may be further processed by digital signal processing 422 and registered as inertial measurements at output registers 438.

A suitable signal of the sense circuitry (e.g., the output of GOS circuitry 420, or in other embodiments, an output of other sense circuitry such as A/D converter 416 or mixer 414) may be provided to the monitoring circuitry 436, which in an embodiment may include a mixer 428, filter 430, correlator 434, and comparison circuitry 434. The mixer 428 may demodulate the received signal with the delayed version of the self-test carrier signal to output a baseband version of the spreading sequence as modified by the suspended spring-mass system (e.g., as modified based on worn or damaged components). This signal may be processed such as by filter 430, which in an embodiment may be a low-pass filter that further assists in removing interfering signals such as higher-frequency vibrations. The filtered signal may be provided to correlator 432, which auto-correlates the delayed version of the spreading sequence to extract the baseband monitor signal (e.g., with a magnitude corresponding to worn or damaged components within the suspended spring-mass system). This signal may be provided as an output to output registers 438 for further processing and analysis (e.g., analyzing self-test outputs over time to identify error patterns, select compensation procedures, and/or modify GOS 420 or digital filter 422 parameters). In some embodiments, comparison circuitry 434 may provide on-board testing and monitoring, such as by comparing the monitor signal or a change in the monitor signal to a threshold, and providing warnings or flags to output register 438 when appropriate.

Figure 5:
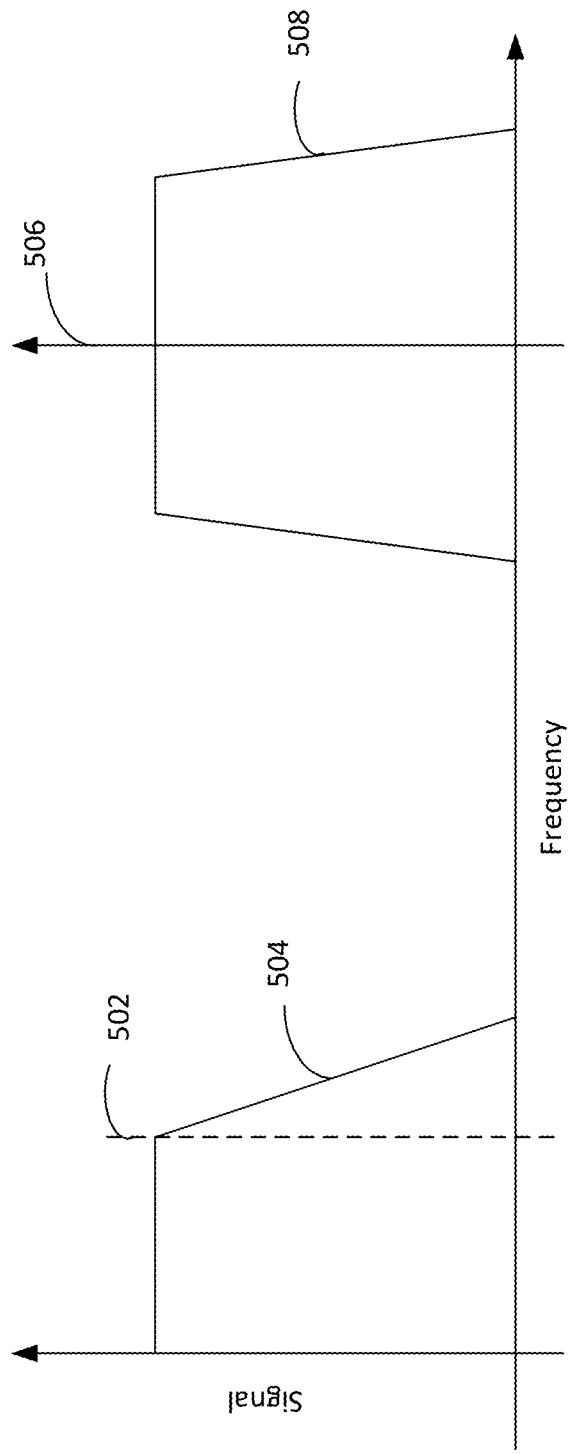
FIG. 5 depicts an exemplary signal spectrum for a MEMS inertial sensor including a self-test signal in accordance with some embodiments of the present disclosure.

FIG. 5 depicts an exemplary signal spectrum for a MEMS inertial sensor including a self-test signal in accordance with some embodiments of the present disclosure. The sense signal is injected to the drive electrode and is depicted by 504 with a maximum usable signal bandwidth 502. The self-test signal is modulated at the self-test carrier frequency 506 and has a self-test spectrum as depicted by 508. The self-test carrier 506 and spectrum 508 are not in the same bandwidth as the drive signal and these out of band monitor tone carriers can be used without disabling the drive and sense measures of the MEMS inertial sensor.

Figure 6:
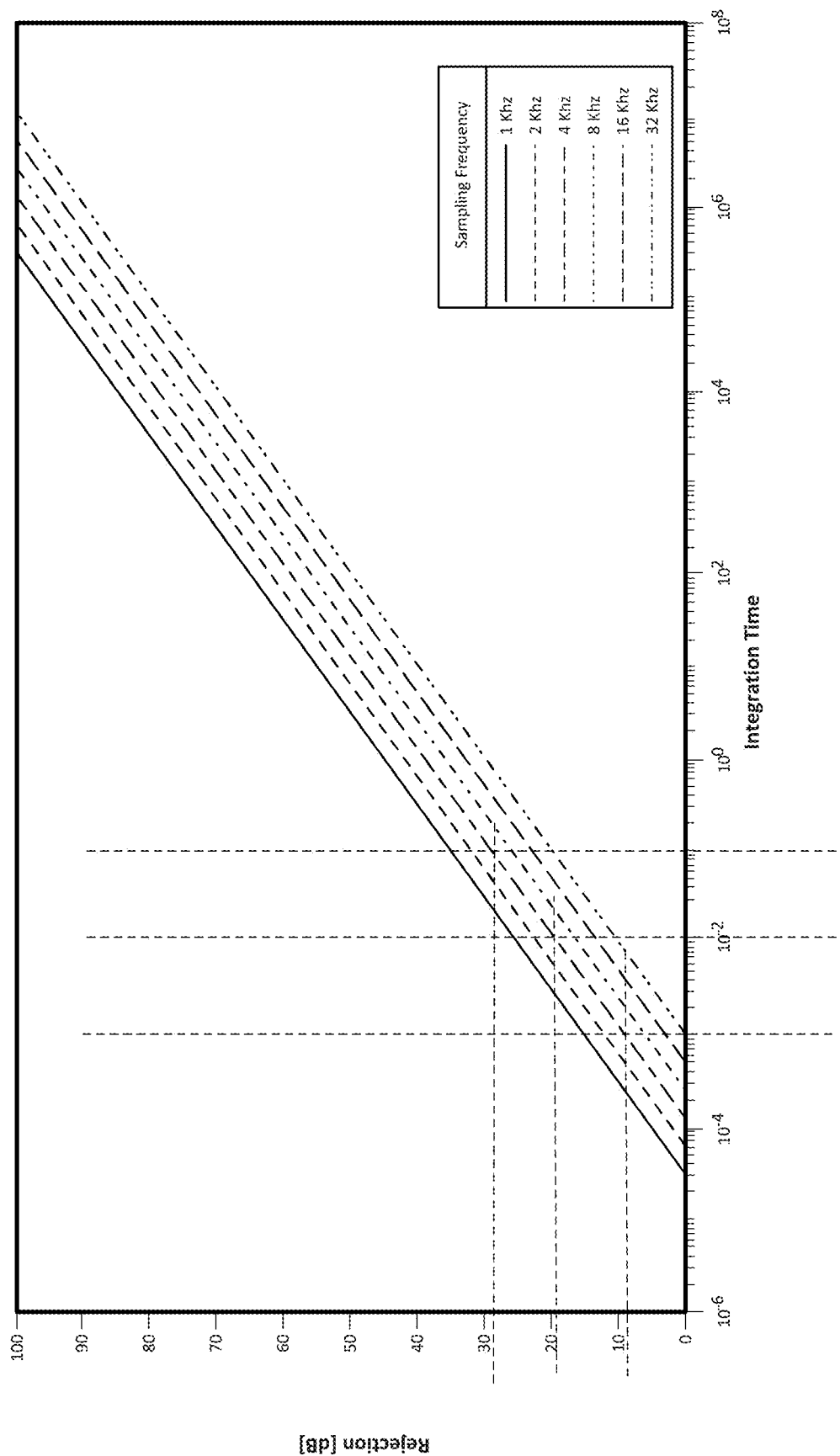
FIG. 6 depicts vibration suppression for exemplary self-test and monitor sampling frequencies in accordance with some embodiments of the present disclosure.

FIG. 6 depicts vibration suppression for exemplary self-test and monitor sampling frequencies (e.g., for the N-length spreading sequence, sense circuitry, and correlators) in accordance with some embodiments of the present disclosure. FIG. 6 depicts examples of rejection of narrowband interferers (in dB) as a function of sampling rate and integration time (e.g., by a correlator) according to spread spectrum theory. The rejection for different sampling frequencies is measured for different integration times. Exemplary sampling frequencies used are 1 kHz, 2 kHz, 4 kHz, 8 kHz, 16 kHz and 32 kHz as shown in FIG. 6. According to spread spectrum theory the rejection is measured as follows:

$$\text{Rejection} = 10\ \log_{10}(f_s T_i)$$

where $f_s$=sampling frequency,
$T_1$=integration time

As an example of the above, it can be seen for an exemplary sampling frequency of 4 Khz, the narrowband rejection increases from 9 dB to 19 dB if the integration time is increased from 1 ms to 10 ms, and further to 29 dB at an integration time of 100 ms. Also, the rejection of the narrowband signals increases with the increase in sampling frequency. Based on this information, an appropriate sampling rate for the system may be determined by balancing bandwidth and integration time design tradeoffs.

Figure 7:
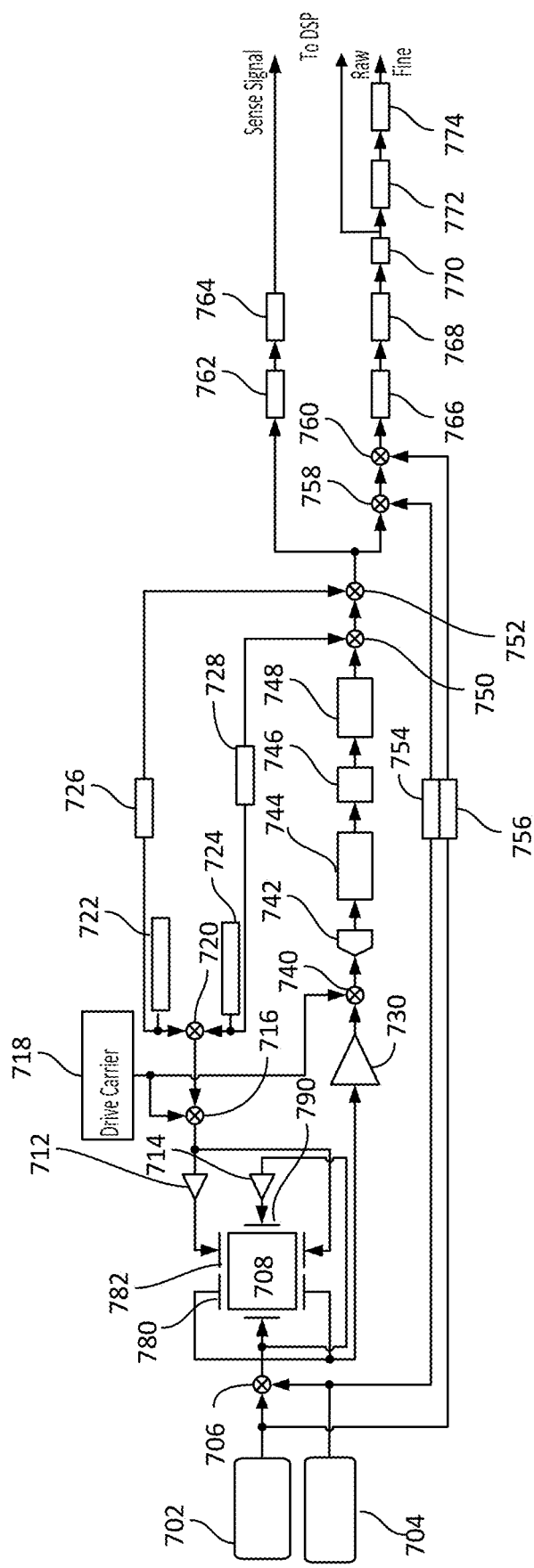
FIG. 7 depicts exemplary MEMS inertial sensor measurement and monitoring using CDMA and spread spectrum modulation in accordance with some embodiments of the present disclosure.

FIG. 7 depicts exemplary MEMS inertial sensor monitoring using CDMA and spread spectrum modulation in accordance with some embodiments of the present disclosure. Although particular components are depicted in FIG. 7 for a particular MEMS inertial sensor, it will be understood that some of the components may be modified, removed, or replaced, and that the order of certain operations may be modified while retaining the spread spectrum AND CDMA monitoring features described herein. In the exemplary embodiment of FIG. 7, both the self-test signal and the drive signal are modulated by spread spectrum and CDMA codes (e.g., with respective pseudo-random codes having a minimum scalar product), allowing the allocation of both the self-test and the drive signal in the same or similar frequency band (e.g., due to CDMA coding) and providing robustness to disturbances for both signals such as interfering vibrations (e.g., due to spread spectrum processing). In this manner, the monitor signal (based on the self-test signal) may measure the characteristics of the suspended spring-mass system within the same or similar frequency range as the operating frequency range of the MEMS inertial sensor (e.g., based on drive signal frequency and bandwidth of sensed inertial forces). The orthogonality between monitor and sense channels is achieved by using orthogonal CDMA symbols such that their cross-correlation is zero. Further modulating the self-test signals and drive signals with spread spectrum techniques improves robustness to disturbances and interference.

In an embodiment of the present disclosure, a CDMA code sequence 702 is generated by self-test circuitry. Similarly, an orthogonal CDMA code sequence 722 is generated by drive circuitry. A spreading sequence (e.g., a pseudo-noise sequence or scrambler) 704 is generated by self-test circuitry. Similarly, a second spreading sequence (e.g., a pseudo-noise sequence or scrambler) 724 may be generated by drive circuitry. Each of the CDMA sequences 702 and 722 and spreading sequences 704 and 724 are provided to respective delay elements 754 and 756 associated with the self-test circuitry (e.g., such that delay element 754 delays spreading sequence 704 and delay element 756 delays CDMA code sequence 702) and to respective delay elements 726 and 728 associated with the drive circuitry (e.g., such that delay element 728 delays spreading sequence 724 and delay element 726 delays CDMA code sequence 722). The delay elements delay the respective spreading sequences and CDMA code sequences for an appropriate time (e.g., corresponding to the propagation time of the self-test signal to the monitoring circuitry and the drive signal to the later-stage sense circuitry via the suspended spring-mass system and initial sense circuitry components) to synchronize the spreading sequences and CDMA code sequences modulated onto the self-test signal and drive signal with the spreading sequences and CDMA code sequences used to demodulate those signals.

The CDMA code sequence 702 and the spreading sequence 704 from the self-test circuitry are provided to encoder 706, which modulates the CDMA sequence 702 with the spreading sequence 704, to generate a self-test signal that is CDMA encoded and is further spread about within a bandwidth based on the spreading sequence 704. The CDMA code sequence 722 and the spreading sequence 724 from the drive circuitry are provided to encoder 720, which modulates the CDMA sequence 722 with the spreading sequence 724, to generate signal that is CDMA encoded and is further spread within a bandwidth based on the spreading sequence 724. The signal from encoder 720 is further provided to mixer 716, which modulates a drive carrier signal 718 generated by the drive circuitry with the output of mixer 716, resulting in a drive signal to be provided to the suspended spring-mass system 708 of the MEMS inertial sensor. The drive carrier signal 718 is also provided to a mixer 740 of the sense circuitry for later demodulation within the sense circuitry.

The self-test signal is injected to the suspended spring-mass system 708 of the MEMS inertial sensor via self-test electrodes 790, with an inverted version of the self-test signal provided to a portion of the self-test electrodes 790 via an inverter 714. The drive signal is injected to the suspended spring-mass system 708 of the MEMS inertial sensor via drive electrodes 782, with an inverted version of the drive signal provided to a portion of the drive electrodes 782 via an inverter 712.

The self-test signal and the drive signal electrically and/or mechanically propagate through the suspended spring-mass system (e.g., based on the sensor type as a static accelerometer or driven gyroscope, and based on self-test electrode 780 configurations) and the electrodes, and then the signals are received by sense circuitry (e.g., capacitance to voltage converter 730, mixer 740, analog-to-digital converter 742, down-sampling circuitry 744, antialiasing filter (not depicted), gain/offset/sensitivity circuitry 746, and equalization circuitry 748) via sense electrodes 780. Capacitances based on the self-test signal, drive signal, and movement of proof masses of the suspended spring-mass system 708 are sensed by sense electrodes 780 and converted into a usable combined signal by capacitance-to-voltage (C2V) converter 730 as a combined signal including both the sense signal (e.g., that is based on the drive signal as is electrically and/or mechanically propagated through the suspended spring-mass system 708) and the monitor signal (e.g., that is based on the self-test signal as is electrically and/or mechanically propagated through the suspended spring-mass system 708). The output from C2V 730 is provided to mixer 740, which demodulates the combined signal based on the drive carrier signal, such that the a combined signal representative of the sense signal and the monitor signal is provided to analog-to-digital converter 742 and down-sampling circuitry 744 for conversion into a suitable digital signal, and further processed by and gain/offset/sensitivity (GOS) correction circuitry 746 to modify the baseband sense signal (e.g., to compensate for known offset or gain effects, for example, as determined by the monitor circuitry). Equalization circuitry 748 may recover portions of the transfer function that may be not flat on a wider bandwidth.

Decoders 750 and 752 (e.g., functioning as correlators) may demodulate the combined signal based on the respective delayed spreading sequence 724 (received via delay element 728) and delayed CDMA code sequence 722 (received via delay element 726) such that the resulting signal includes a baseband sense signal corresponding to the sensed inertial force from the suspended spring-mass system 708 of the MEMS inertial sensor as well as the CDMA and spread spectrum modulated self-test signal. The output of the mixers 752 may be provided to the later-stage sense path (e.g., including averaging circuitry 762 and decimator 764) and to a monitoring circuitry path (e.g., including mixers/correlators 758/760, CDMA sample averaging circuitry 768, CDMA sample decimator 768, power measurement circuitry 770, spread sequence sample averaging circuitry 772, and spread sequence sample decimator 774).

Within the later-stage sense path, averaging circuitry 762 and decimator 764 may process the extracted sense signal based on the CDMA sampling rate to output a baseband sense signal representative of the sensed inertial force, with the averaging and decimation further removing any significant content of the monitor signal from the sense signal that is provided to additional processing circuitry (e.g., a digital signal processor) for determination and further processing of the sensed inertial force.

Within the monitoring circuitry the output of mixers 750 and 752 may be further processed by mixer/correlators 758 and 760. In the embodiment of FIG. 7, the mixer/correlator 758 may demodulate the received signal with the delayed version of the self-test spreading sequence 740 from delay element 754 while the mixer/correlator 760 may demodulate the output signal of mixer/correlator 758 with the delayed version of the self-test CDMA code sequence 702 from delay element 756 to output a baseband version of the spreading sequence as modified by the suspended spring-mass system (e.g., corresponding worn or damaged components, or other changes in sensitivity). Averaging circuitry 766 and decimator 768 may process the demodulated monitor signal based on the CDMA sampling rate of the CDMA code sequence 702 to output a baseband monitor signal (including spread spectrum content), the overall power of which may be measured power measurement circuitry 770 to provide a raw measure of the monitor signal (e.g., with a magnitude corresponding to worn or damaged components within the suspended spring-mass system). This signal may be provided to the further processing circuitry (e.g., DSP circuitry) for further processing and analysis (e.g., analyzing self-test outputs over time to identify error patterns, select compensation procedures, and/or modify GOS 746 or other filter parameters). Additional averaging circuitry 772 and decimator 774 may process the demodulated monitor signal based on the spreading signal sampling rate of the spreading sequence 704 to provide a more accurate measure of the monitor signal (e.g., based on additional averaging of the signals) for processing.

Figure 8A:
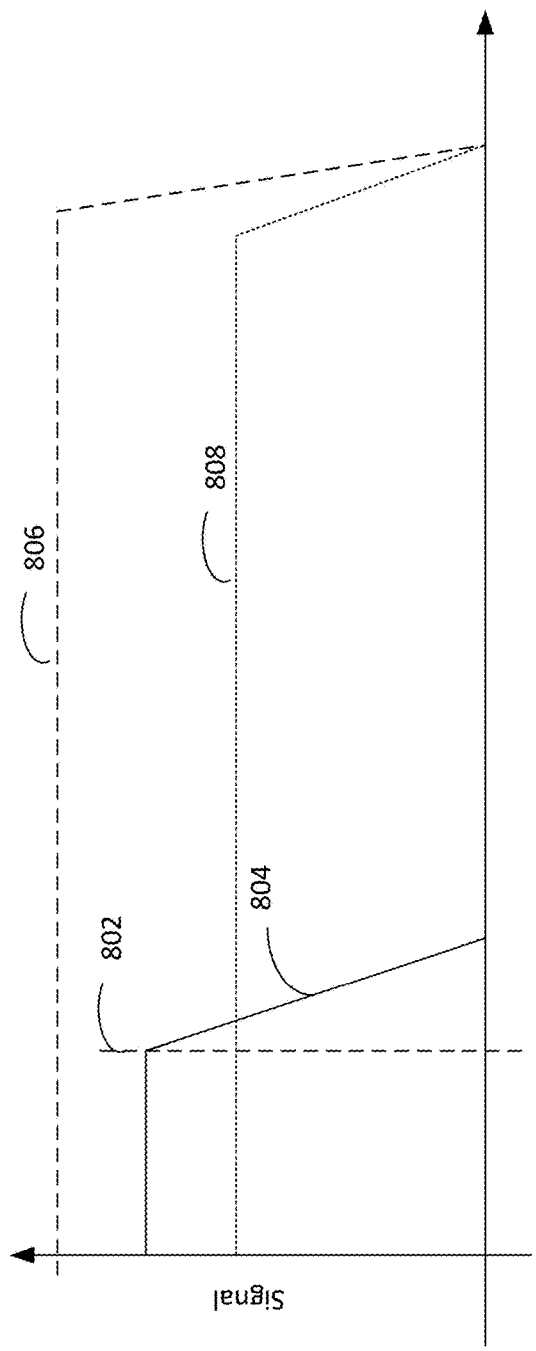
FIG. 8A depicts an exemplary signal spectrum for a MEMS inertial sensor including spread spectrum modulation of the drive and self-test signals in accordance with some embodiments of the present disclosure.

FIG. 8A depicts an exemplary signal spectrum for a MEMS inertial sensor including CDMA and spread spectrum modulation of the drive and self-test signals in accordance with some embodiments of the present disclosure. A sense signal that is received at sense electrodes without spreading is depicted as signal 804 and has a maximum signal bandwidth 802. By spreading the drive and self-test signals a sense signal 808 associated with a spread spectrum drive signal may be spread over a greater bandwidth than the uncoded sense signal 804. A spread spectrum self-test signal 806 may be spread over a similar bandwidth as the spread spectrum sense signal 808, but the signals may not interfere within this bandwidth due to the CDMA encoding of both signals.

Figure 8B:
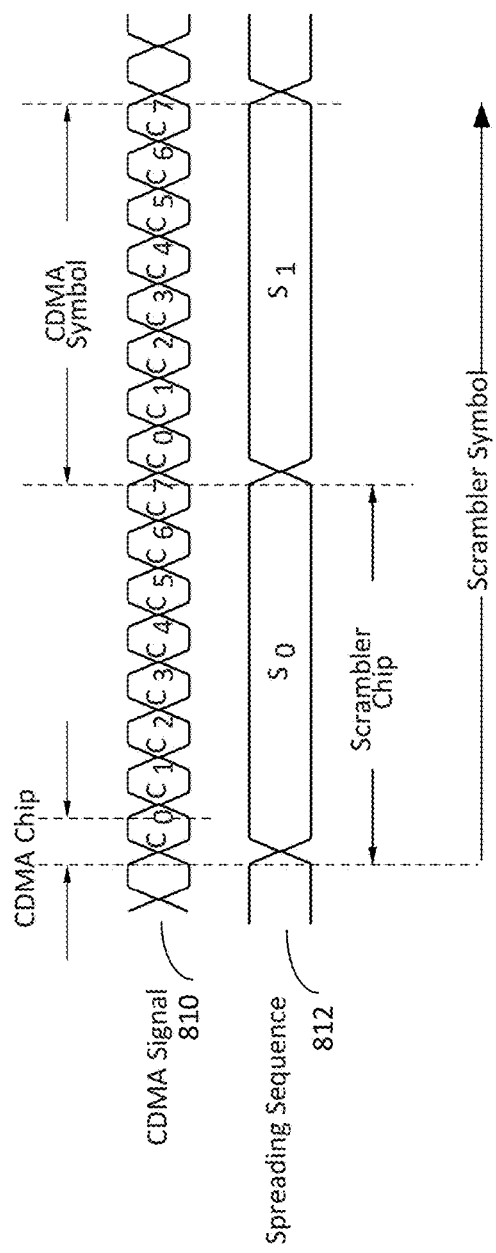
FIG. 8B depicts an exemplary timing diagram of CDMA signals and spreading sequence signals in accordance with some embodiments of the present disclosure.

FIG. 8B depicts an exemplary synchronization of CDMA signals and spreading sequence signals in accordance with some embodiments of the present disclosure. The self-test circuitry and drive circuitry generate the respective CDMA code sequences and spreading sequences based on CDMA signals (e.g., CDMA signal 810) and spreading sequences (e.g., spreading signal 812) that have "chips" (e.g., corresponding to periods for the respective sequences). In an embodiment, the timing of the respective chips is aligned such that a chip of the spreading sequence corresponds to a complete CDMA symbol (e.g., comprising 8 CDMA chips). In this manner, the modulation and demodulation of the self-test signal, drive signal, monitor signal, and sense signal are performed with the CDMA code sequences and spreading sequences in phase alignment, and preventing obfuscation of either sequence at chip or symbol transitions.

Figure 9:
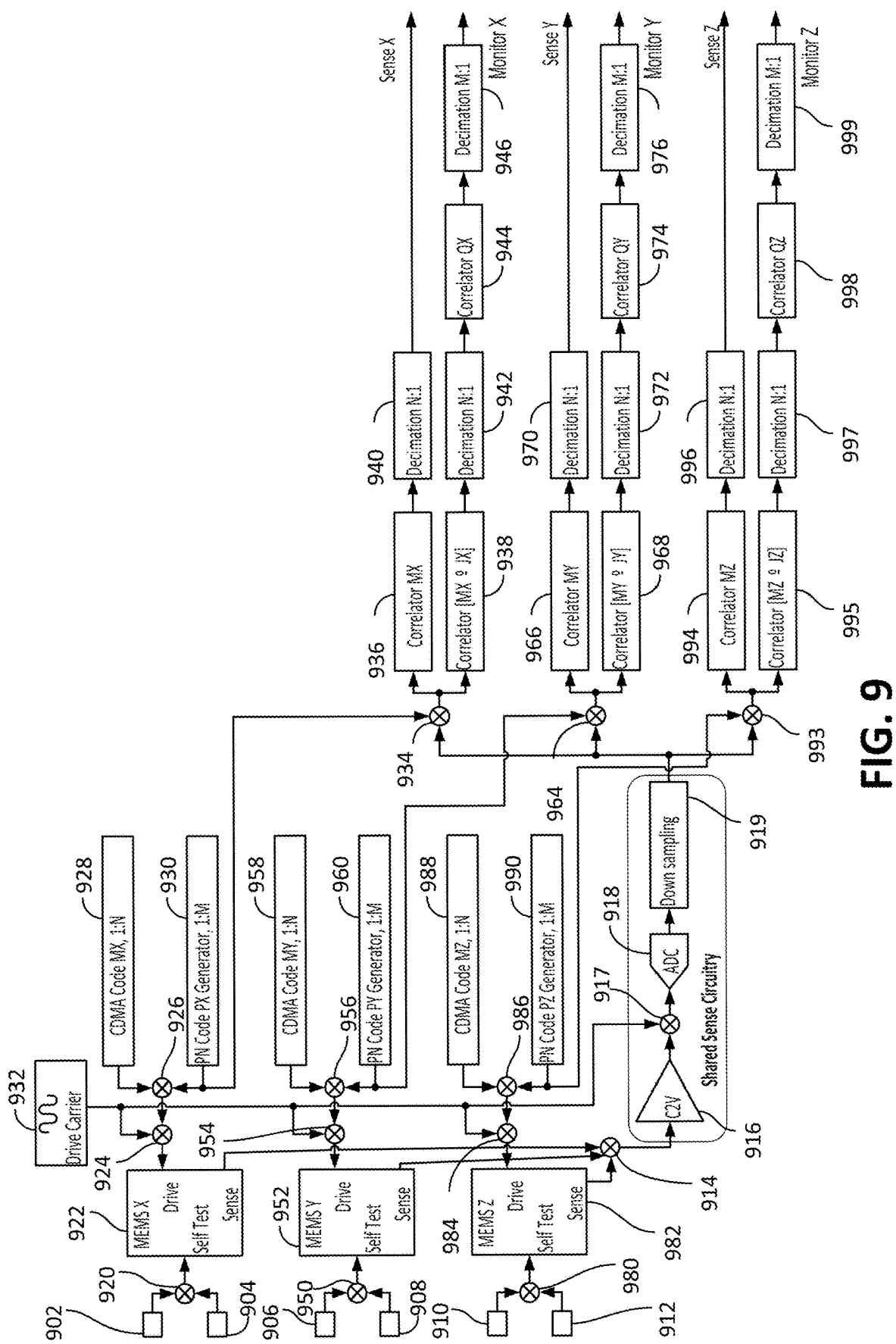
FIG. 9 depicts an exemplary multi-axis MEMS inertial sensor with self-test signal and drive signal modulation using CDMA and spread spectrum modulation and a drive carrier modulation in accordance with some embodiments of the present disclosure.

FIG. 9 depicts an exemplary multi-axis MEMS inertial sensor with self-test signal and drive signal modulation using CDMA and spread spectrum modulation and a drive carrier modulation in accordance with some embodiments of the present disclosure. FIG. 9 has an example of a complete system where CDMA and spread spectrum are jointly used in a MEMS architecture for multiplexing both self-test and drive signals over multiple sensing axes using a single mixed signal hardware. In some embodiments of the present disclosure, one or more of the components depicted and described in FIG. 9 may be modified or replaced, one or more additional components may be added, and aspects of the order of operations may be changed.

In an embodiment of the present disclosure, an architecture to simultaneously measure inertial forces sensed along and/or about multiple axes and to perform MEMS inertial sensing though shared sense circuitry is implemented with CDMA and spread spectrum encoding of the self-test and drive signals for each of the relevant MEMS inertial sensor axes and suspended spring-mass systems (e.g., a suspended spring-mass system 922 associated with an x-axis MEMS inertial sensor, suspended spring-mass system 952 associated with a y-axis MEMS inertial sensor, and suspended spring-mass system 982 associated with a z-axis MEMS inertial sensor). For example, self-test circuitry associated with x-axis suspended spring-mass system 922 generates CDMA code sequence 902 and spreading sequence 904 (e.g., N-sample CDMA code JX 902 and M-sample spread spectrum pseudo code OX 904) that are combined by encoder 920 to generate a self-test signal that is applied to suspended spring-mass system 922 (e.g., via self-test electrodes, not depicted in FIG. 9). Self-test circuitry associated with y-axis suspended spring-mass system 952 generates CDMA code sequence 906 and spreading sequence 908 (e.g., N-sample CDMA code JY 906 and M-sample spread spectrum pseudo code OY 908) that are combined by encoder 950 to generate a self-test signal that is applied to suspended spring-mass system 952 (e.g., via self-test electrodes, not depicted in FIG. 9). Self-test circuitry associated with z-axis suspended spring-mass system 982 generates CDMA code sequence 910 and spreading sequence 912 (e.g., N-sample CDMA code JZ 910 and M-sample spread spectrum pseudo code OZ 908) that are combined by encoder 980 to generate a self-test signal that is applied to suspended spring-mass system 982 (e.g., via self-test electrodes, not depicted in FIG. 9).

Each of the MEMS inertial sensors may also have respective drive circuitry. For example, drive circuitry associated with x-axis suspended spring-mass system 922 generates CDMA code sequence 928 and spreading sequence 930 (e.g., N-sample CDMA code MX 928 and M-sample spread spectrum pseudo code PX 930) that are combined by encoder 926 and further combined with a drive carrier signal 932 at modulator 924 to generate a drive signal that is applied to suspended spring-mass system 922 (e.g., via drive electrodes, not depicted in FIG. 9). Drive circuitry associated with y-axis suspended spring-mass system 952 generates CDMA code sequence 958 and spreading sequence 960 (e.g., N-sample CDMA code MY 958 and M-sample spread spectrum pseudo code PY 960) that are combined by encoder 956 and further combined with a drive carrier signal 932 at modulator 954 to generate a drive signal that is applied to suspended spring-mass system 952 (e.g., via drive electrodes, not depicted in FIG. 9). Drive circuitry associated with z-axis suspended spring-mass system 982 generates CDMA code sequence 988 and spreading sequence 990 (e.g., N-sample CDMA code MZ 988 and M-sample spread spectrum pseudo code PZ 990) that are combined by encoder 986 and further combined with a drive carrier signal 932 at modulator 984 to generate a drive signal that is applied to suspended spring-mass system 982 (e.g., via drive electrodes, not depicted in FIG. 9).

In some embodiments, aspects of the self-test circuitry for the respective axes (e.g., code generators, etc.) may be shared between the respective MEMS inertial sensor axes and/or aspects of the drive circuitry for the respective axes (e.g., code generators, etc.) may be shared between the respective MEMS inertial sensor axes. The respective CDMA code sequences and spreading sequences generated by the self-test circuitry and drive circuitry may be such that the respective self-test signals and sense signals are orthogonal within a common bandwidth for combined signals from the MEMS inertial sensors, while the signals are spread for robustness against disturbances. Example conditions for CDMA code generation are described for x-axis and y-axis self-test and drive signals below and apply equally to comparison of codes between additional axes (e.g., between CDMA codes for the x-axis and z-axis, or between CDMA codes for the y-axis and z-axis). Let Mx be the code applied to the drive, and Jx be the code applied, on same channel (e.g. x), to the Self-Test, such that orthogonality conditions are expressed as follows:

$$Mx \otimes Mx = 1$$

$$Mx \otimes My = 0, x \neq y$$

$$[Mx \circ Jx] \otimes My = 0, x \neq y \text{ or } x = y$$

$$[Mx \circ Jx] \otimes [My \circ Jy] = 0, x \neq y$$

$$[Mx \circ Jx] \otimes [Mx \circ Jx] = 1$$

Where: '$\otimes$' denotes inner product, '$\circ$' denotes element by element product. According to these equations, the code M is applied to drive superposes to the code Jx applied to the self-test on the same channel, due to the fact that every signal applied to the self-test is propagated by the proof mass. Thus, the effective CDMA code applied to the self-test is not Mx, but the combination (element by element product) between Mx and Jx.

The respective self-test signal and drive signal for each axis propagates through and is modified based on a respective suspended spring-mass system (e.g., with the self-test signals modified based on the condition and sensitivity of the suspended spring-mass system to generate monitor signals, and the drive signals modified based on the sensed inertial force to generate sense signals), with each suspended spring mass system outputting a combined signal. For example, the x-axis suspended spring-mass system 922 may output a first combined signal (corresponding to a monitor signal based on a self-test signal from encoder 920 as modified by the suspended spring-mass system 922 and a sense signal corresponding to the drive signal provided from modulator 924 as modified by the sensed x-axis inertial force of suspended spring-mass system 922), the y-axis suspended spring-mass system 952 may output a second combined signal (corresponding to a monitor signal based on a self-test signal from encoder 950 as modified by the suspended spring-mass system 952 and a sense signal corresponding to the drive signal provided from modulator 954 as modified by the sensed y-axis inertial force of suspended spring-mass system 952), and the z-axis suspended spring-mass system 982 may output a third combined signal (corresponding to a monitor signal based on a self-test signal from encoder 980 as modified by the suspended spring-mass system 982 and a sense signal corresponding to the drive signal provided from modulator 984 as modified by the sensed z-axis inertial force of suspended spring-mass system 982).

In an embodiment, because of the orthogonal CDMA code sequences applied to modulate the respective self-test and drive signals for different sense axes, the three combined signals (e.g., the x-axis combined signal from suspended spring-mass system 922, the y-axis combined signal from suspended spring-mass system 952, and the z-axis combined signal from suspended spring-mass system 982) may be combined at summing node 914 to be simultaneously processed by shared sense circuitry. Although in the exemplary embodiment of FIG. 9, the shared sense circuitry may include C2V converter stage 916, demodulator 917, ADC 98, and down-sampling circuitry 919 as described herein, in some embodiments the shared circuitry may include other sense circuitry such as GOS circuitry and digital processing circuitry. The commonly processed signal (e.g., including combined signals for each of the x-axis, y-axis, and z-axis inertial sensors, as processed by the shared sense circuitry) may be provided to each of three respective processing paths for extracting the respective monitor signals and sense signals based on demodulation/correlation with the associated CDMA code sequences and spreading sequences for each particular axis.

In an embodiment of the present disclosure, for each sense axis, the spreading sequence (e.g., a delayed version thereof) used to modulate the respective drive signal is provided to a respective demodulator to remove the spreading associated with the particular axis while maintaining spreading for the other two axes. For example, demodulator 934 associated with the x-axis suspended spring-mass system 922 receives a delayed spreading sequence 930 (delay element not depicted) as an input to remove the spreading associated with only the x-axis drive signal, demodulator 964 associated with the y-axis suspended spring-mass system 952 receives a delayed spreading sequence 960 (delay element not depicted) as an input to remove the spreading associated with only the y-axis drive signal, and demodulator 993 associated with the z-axis suspended spring-mass system 982 receives a delayed spreading sequence 990 (delay element not depicted) as an input to remove the spreading associated with only the z-axis drive signal. In this manner, the signals that are not relevant to the sensing or monitoring for the particular axis will remain spread throughout the remaining processing steps for each axis.

A sense-extraction path for each axis may include a correlator to correlate the relevant combined signal for each axis with a delayed version of the original CDMA code sequence used to generate the respective drive signal for the sense signal (signal paths for CDMA code sequences and delay element not depicted) followed by N-sample decimation, resulting in a sense signal representative of the sensed inertial force. For example, within the x-axis processing path, correlator 936 may process the output of demodulator 934 with the delayed original CDMA code sequence 928 used to generate the x-axis drive signal and decimator 940 may process the resulting signal according to the N-sampling rate of the CDMA sequence. Within the y-axis processing path, correlator 966 may process the output of demodulator 964 with the delayed original CDMA code sequence 958 used to generate the y-axis drive signal and decimator 970 may process the resulting signal according to the N-sampling rate of the CDMA sequence. Within the z-axis processing path, correlator 994 may process the output of demodulator 993 with the delayed original CDMA code sequence 958 used to generate the x-axis drive signal and decimator 996 may process the resulting signal according to the N-sampling rate of the CDMA sequence.

A monitor-extraction path for each axis may include a correlator to correlate the relevant combined signal with the delayed versions of the original CDMA code sequences used to generate the respective drive signal and self-test signal (signal paths and delay elements for CDMA code sequences not depicted) followed by N-sample decimation, resulting in a spread monitor signal that is further processed by correlation with the a delayed version of the spreading sequence associated with the respective axis (signal paths and delay elements for spreading sequences not depicted in FIG. 9) followed by M-sample decimation. For example, within the x-axis processing path, correlator 942 may process the output of demodulator 934 with the original CDMA code sequence 928 used to generate the x-axis drive signal and the original CDMA code sequence 902 used to generate the x-axis self-test signal, decimator 942 may process the resulting signal according to the N-sampling rate of the CDMA code sequence, correlator 944 may process the output of decimator 942 with the original spreading sequence 904 used to generate the self-test signal, and decimator 946 may process the resulting signal according to the M-sampling rate of the spreading sequence. Within the y-axis processing path, correlator 968 may process the output of demodulator 964 with the original CDMA code sequence 958 used to generate the y-axis drive signal and the original CDMA code sequence 906 used to generate the y-axis self-test signal, decimator 972 may process the resulting signal according to the N-sampling rate of the CDMA code sequence, correlator 974 may process the output of decimator 972 with the original spreading sequence 908 used to generate the self-test signal, and decimator 976 may process the resulting signal according to the M-sampling rate of the spreading sequence. Within the z-axis processing path, correlator 995 may process the output of demodulator 993 with the original CDMA code sequence 988 used to generate the z-axis drive signal and the original CDMA code sequence 910 used to generate the z-axis self-test signal, decimator 997 may process the resulting signal according to the N-sampling rate of the CDMA code sequence, correlator 998 may process the output of decimator 997 with the original spreading sequence 912 used to generate the self-test signal, and decimator 976 may process the resulting signal according to the M-sampling rate of the spreading sequence.

The resulting monitor signals and sense signals for each axis may be provided to additional processing circuitry (e.g., a DSP) for further processing as described herein. For example, the sense signals may be processed (e.g., including gain/offset/sensitivity processing) to determine inertial forces and/or calculate parameters based on combinations and further processing of sense signals. The monitor signals may be processed to identify sensitivity and other errors in the suspended spring-mass system and/or sense circuitry, generate alarms and warnings, and to provide compensation for the sense signals. In some embodiments, the monitor signals for the different axes may be analyzed together, for example, to identify changes in sensitivity that may be due to common causes (e.g., changes in external conditions and environment, operation of adjacent circuitry, etc.) as opposed to changes experienced by only one axis.

Figure 10:
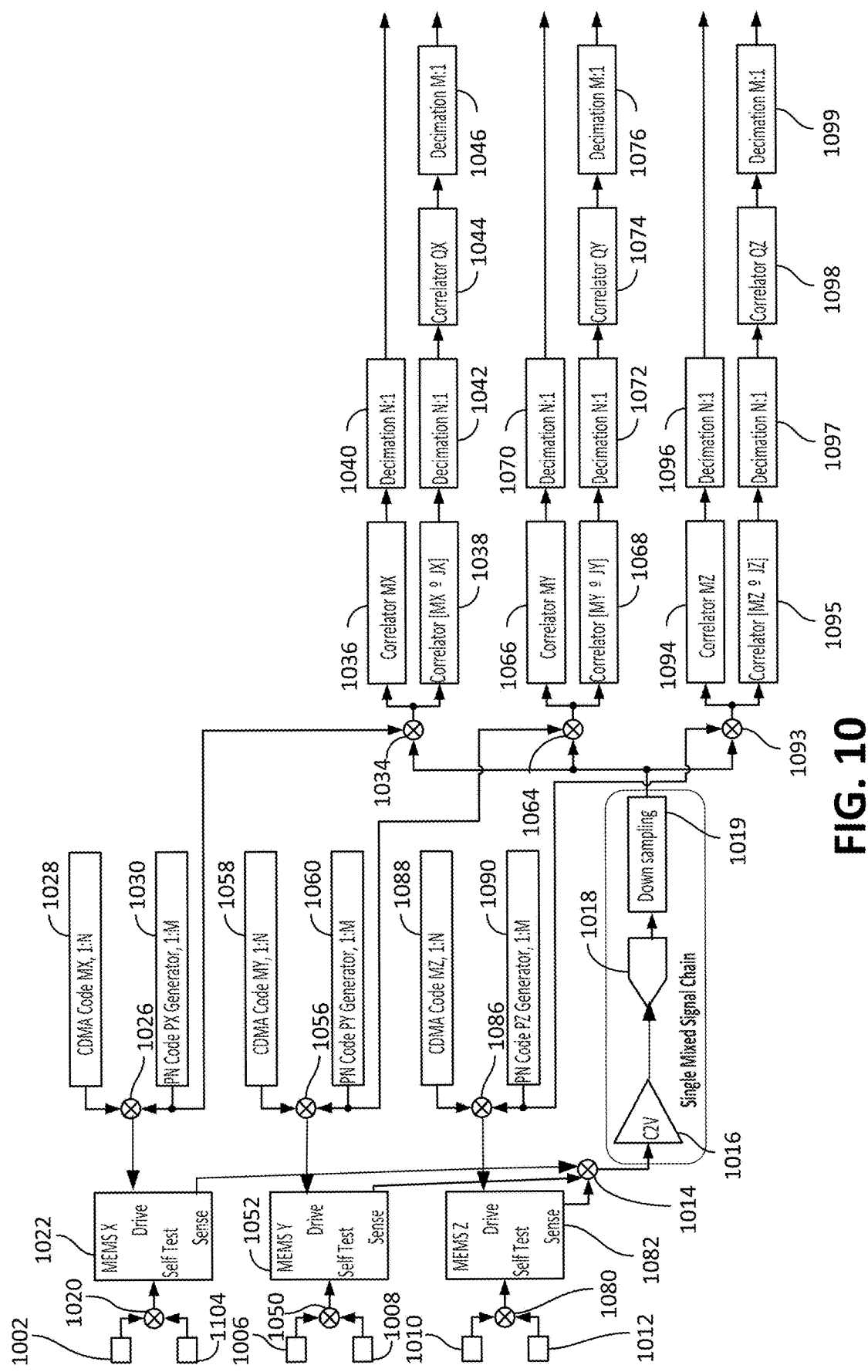
FIG. 10 depicts exemplary multi-axis MEMS inertial sensor using CDMA and spread spectrum modulation with a carrier-less CDMA drive signal in accordance with some embodiments of the present disclosure.

FIG. 10 depicts exemplary multi-axis MEMS inertial sensor using CDMA and spread spectrum modulation with a carrier-less CDMA drive signal in accordance with some embodiments of the present disclosure. In the exemplary embodiment of FIG. 10, depicted components may be similar to components depicted in FIG. 9, for example, with similar components depicted in a similar manner and having similar reference numerals. In the exemplary embodiment of FIG. 10, the drive signal is applied to each of the suspended spring-mass systems based only on the CDMA code sequences and spreading sequences, i.e., without a periodic drive carrier signal. For example, a drive signal provided to the suspended spring-mass system of x-axis MEMS inertial sensor 1022 may be provided by encoder 1026 (e.g., which combines CDMA code sequence 1028 and spreading sequence 1030 as the drive signal), a drive signal provided to the suspended spring-mass system of y-axis MEMS inertial sensor 1052 may be provided by encoder 1056 (e.g., which combines CDMA code sequence 1058 and spreading sequence 1060 as the drive signal), and a drive signal provided to the suspended spring-mass system of z-axis MEMS inertial sensor 1082 may be provided by encoder 1086 (e.g., which combines CDMA code sequence 1088 and spreading sequence 1090 as the drive signal). In some embodiments of the present disclosure, one or more of the components depicted and described in FIG. 10 may be modified or replaced, one or more additional components may be added, and aspects of the order of operations may be changed.

The carrier frequency and bandwidth for each of the drive signals may be embedded within the respective CDMA code sequences. In an embodiment of the present disclosure, ADC 1018 may have passband corresponding to the carrier frequency and bandwidth of the drive signals and to reject disturbances. Although not depicted in FIG. 10, in some embodiments a suitable filter and/or additional filters may be included to remove noise from the received combined signal. The filtered combined signals may then be further processed as described herein, for example, to demodulate and process the respective sense and monitor signals for each of the respective axes.

Figure 11:
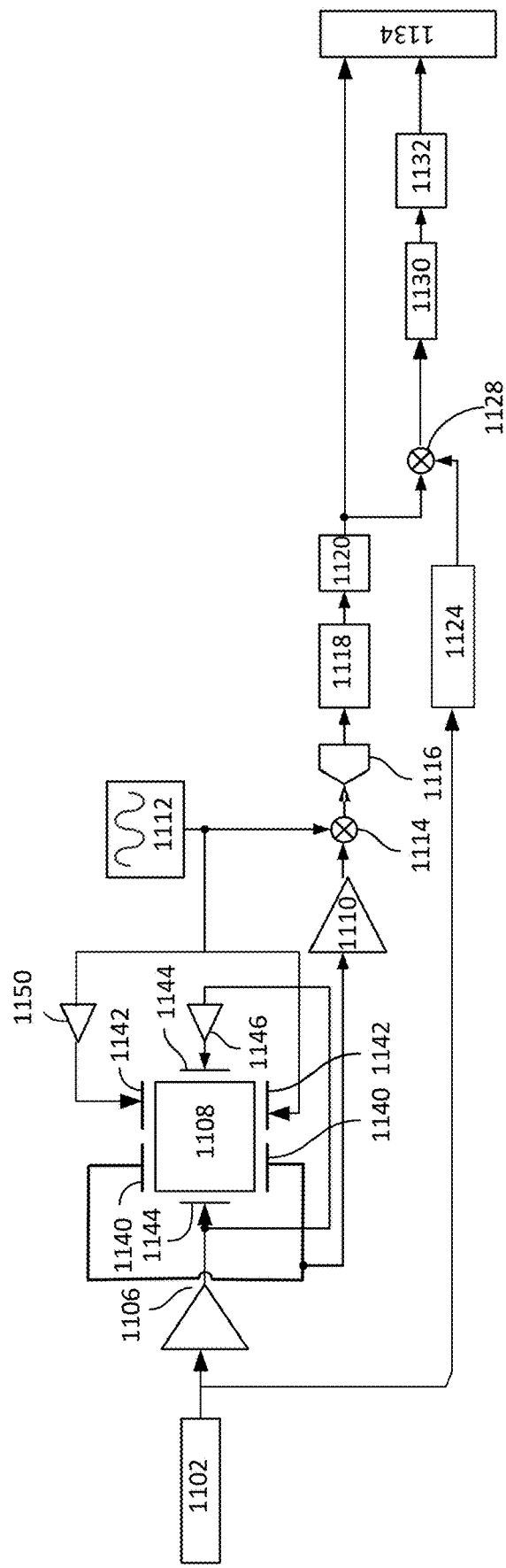
FIG. 11 depicts exemplary correlated noise injection for a MEMS inertial sensor in accordance with some embodiments of the present disclosure.

FIG. 11 depicts exemplary correlated noise injection for a MEMS inertial sensor in accordance with some embodiments of the present disclosure. In some of the embodiments of this disclosure, the sense and monitor signals may be modulated within a common bandwidth. The CDMA code sequence, when combined with the spread sequence, may have a zero at a frequency at or near zero Hz, as a result of some CDMA codes being digital carrier-like signals having zero mean value (e.g., Walsh/Hadamard codes). When the self-test signal is modulated in this manner, sensitivity variations near the zero frequency may not be accurately identified from a resulting monitor signal. In order to overcome these limitations, a very low-power random signal may be injected on the self-test electrodes, below the typical noise level, removing the CDMA modulation and therefore free from the zero near zero Hz. Although the correlated noise injection of FIG. 11 may be utilized independently from other embodiments described herein, in some embodiments, the correlated noise injection of FIG. 11 may be periodically utilized to measure a response at zero Hz (e.g., by selectively temporarily disabling use of CDMA modulation).

The drive signal 1112 may be provided (e.g., as a suitable carrier signal as depicted in FIG. 11) directly to one of drive electrodes 1142 and to another of drive electrodes 1142 via inverter 1146. In the exemplary embodiment of FIG. 11, self-test circuitry may generate a spreading sequence 1102 (e.g., a pseudo-random N-sample spreading sequence) that is injected into self-test electrodes 1444 via drive amplifier 1106 (e.g., a 12 mV driver) and inverter 1146. In an exemplary embodiment, a typical noise specification may be on the order of 5 milli-gees over a 50 Hz bandwidth. An exemplary spread self-test signal may thus allocate a suitable noise signal of 500µ-gee over 50 Hz bandwidth, for example, at an order of magnitude less than the noise specification. This corresponds to approximately 4.5 milli-gees over a 4 kHz bandwidth (e.g., $500e^{-6}*\sqrt{(4000/50)}$). For an exemplary electrode sensitivity of approximately 2.5 V/gee, an appropriate dithering signal may be injected at 11.3 mV on the self-test electrodes at 4 Khz (e.g., via drive amplifier 1106).

The self-test signal and the drive signal electrically and/or mechanically propagate through the suspended spring-mass system (e.g., based on the sensor type as a static accelerometer or driven gyroscope, and based on self-test electrode 1144 configurations) and are received by sense circuitry (e.g., capacitance to voltage converter 1110, mixer 1114, analog-to-digital converter 1116, decimation circuitry 1118, and gain/offset/sensitivity circuitry 1120) as a monitor signal and sense signal via sense electrodes 1140. Capacitances based on the self-test signal, drive signal, and movement of proof masses of the suspended spring-mass system 1108 are sensed by sense electrodes 1140 and converted into a usable combined signal by capacitance-to-voltage (C2V) converter 1110 as a combined signal including both the sense signal and the monitor signal. The output from C2V 1110 is provided to mixer 1114, which partially demodulates the combined signal based on the drive signal 1112, such that a signal that is representative of the baseband sense signal and the monitor signal is provided to analog-to-digital converter 1116 and decimation circuitry 1118 for conversion into a suitable digital signal. In an embodiment, in order to get the monitor signal to a suitable magnitude (e.g., corresponding to at least a 1.0 gee level), the combined signal needs to be integrated over a suitable number of samples (e.g., for at least 222 samples, corresponding to 55.5 ms). The output of the decimation circuitry 1118 may be further processed such as by gain/offset/sensitivity (GOS) correction circuitry 1120 to modify the baseband sense signal (e.g., to compensate for known offset or gain effects). Because the spread spectrum monitor signal does not interfere with the baseband sense signal, the sense signal may be further processed (e.g., by digital signal filters, not depicted in FIG. 11) and provided as inertial measurements to output registers 1134.

A suitable signal of the sense circuitry (e.g., the output of GOS circuitry 1120, or in other embodiments, an output of other sense circuitry such as A/D converter 1116 or mixer 1114) may be provided to the monitoring circuitry, which in an embodiment may include a mixer 1128, filter 1130, correlator 1134, and analysis circuitry such as comparison circuitry. The mixer 1128 may demodulate the received signal with the delayed version of the spreading signal to output a baseband version monitor signal as modified by the suspended spring-mass system (e.g., corresponding worn or damaged components). Averaging circuitry 1130 and decimator 1132 may process the demodulated monitor signal based on the spreading sequence sampling rate to output a baseband monitor signal (e.g., with a magnitude corresponding to worn or damaged components within the suspended spring-mass system). This signal may be provided to the output registers 1134 for further processing and analysis (e.g., analyzing self-test outputs over time to identify error patterns, select compensation procedures, and/or modify GOS 1120 or digital filter parameters). In some embodiments, comparison circuitry may provide on-board testing and monitoring, such as by comparing the monitor signal or a change in the monitor signal to a threshold and providing warnings or flags to output register 1134 when appropriate.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A microelectromechanical (MEMS) inertial sensor, comprising:
at least one proof mass configured to move in response to an inertial linear or angular force and to provide a sense signal;
at least one drive electrode;
drive circuitry coupled to the at least one drive electrode to apply a drive signal to the at least one proof mass via the at least one drive electrode, wherein the sense signal is based on the drive signal and the movement of the at least one proof mass;
at least one self-test electrode;
self-test circuitry coupled to the at least one self-test electrode to apply a spread spectrum self-test signal to the at least one self-test electrode, wherein the self-test signal is at least partially transmitted through the at least one proof mass to generate a monitor signal;
at least one sense electrode configured to receive a combined signal comprising the sense signal and the monitor signal from the at least one proof mass; and
processing circuitry coupled to the at least one sense electrode, wherein the processing circuitry is configured to:
identify the sense signal from the combined signal based on one or more characteristics of the drive signal;
identify the monitor signal from the combined signal based on one or more characteristics of the spread spectrum self-test signal;
determine a measure of the inertial linear or angular force for the MEMS inertial sensor based on the identified sense signal; and
modify the measure of the inertial linear or angular force based on the identified monitor signal.

2. The MEMS inertial sensor of claim 1, wherein the self-test circuitry generates the spread spectrum self-test signal based on a spreading sequence and a periodic carrier signal.

3. The MEMS inertial sensor of claim 1, wherein the spread spectrum self-test signal is based on a spreading sequence and a code division multiple access (CDMA) signal.

4. The MEMS inertial sensor of claim 3, wherein a chip of the spreading sequence has a duration corresponding to at least a full CDMA symbol of the CDMA signal.

5. The MEMS inertial sensor of claim 3, wherein the processing circuitry comprises:
a first correlator configured to apply a delayed version of the spreading sequence to a version of the combined signal; and
a second correlator configured to apply a delayed version of the CDMA signal to the output of the first correlator to identify the monitor signal.

6. The MEMS inertial sensor of claim 3, wherein the drive signal is based on a second spreading sequence, a second code division multiple access (CDMA) signal, and a periodic drive carrier signal.

7. The MEMS inertial sensor of claim 6, wherein the first CDMA signal and the second CDMA signal have a minimum scalar product.

8. The MEMS inertial sensor of claim 6, wherein the first spreading sequence signal and the second spreading sequence have minimum cross correlation.

9. The MEMS inertial sensor of claim 6, wherein the processing circuitry comprises:
a first correlator configured to apply a delayed version of the second spreading sequence to a version of the combined signal;
a second correlator configured to apply a delayed version of the second CDMA signal to the output of the first correlator to identify the sense signal;
a third correlator configured to apply a delayed version of the spreading sequence to the output of the second correlator; and
a fourth correlator configured to apply a delayed version of the CDMA signal to the output of the third correlator to identify the monitor signal.

10. The MEMS inertial sensor of claim 1, wherein the processing circuitry comprises gain modification circuitry, offset modification circuitry, or sensitivity modification circuitry, and wherein an operation of at least one of the gain modification circuitry, offset modification circuitry, or sensitivity modification circuitry is modified based on the monitor signal measure.

11. The MEMS inertial sensor of claim 10, wherein the operation of each of the gain modification circuitry, offset modification circuitry, and sensitivity modification circuitry is modified based on the monitor signal measure.

12. The MEMS inertial sensor of claim 1, wherein the spread spectrum self-test signal and the drive signal are in-band.

13. The MEMS inertial sensor of claim 1, wherein a signal pattern of the spread spectrum self-test signal comprises a sequence of spreading elements applied to a periodic signal such that said periodic signal has null average over a predefined time interval T, wherein the time interval T is shorter than the duration of the spreading elements of the sequence.

14. A method for performing a self-test for a microelectromechanical (MEMS) inertial sensor, comprising:
providing, from drive circuitry to at least one proof mass, a drive signal, wherein a sense signal is based on the drive signal and a movement of the at least one proof mass in response to an inertial linear or angular force;
providing, from self-test circuitry to the at least one proof mass, a spread spectrum self-test signal, wherein the self-test signal is at least partially transmitted through the at least one proof mass to generate a monitor signal;
receiving, from the at least one proof mass by at least one sense electrode, a combined signal comprising the sense signal and the monitor signal;
identifying the sense signal from the combined signal based on one or more characteristics of the drive signal;
identifying the monitor signal from the combined signal based on one or more characteristics of the spread spectrum self-test signal;
determining a measure of the inertial linear or angular force based on the identified sense signal; and
modifying the measure of the inertial linear or angular force based on the identified monitor signal.

15. A method for identifying an error of a microelectromechanical (MEMS) MEMS inertial sensor, comprising:
applying, from a first signal source, a drive signal to at least one proof mass;
applying, from second signal source, a code division multiple access (CDMA) self-test signal to the at least one proof mass, wherein the first signal source generates the drive signal independently from the second signal source generating the self-test signal;
receiving, by at least one sense electrode associated with the at least one proof mass, a combined signal comprising a sense channel that is based on the drive signal and an inertial linear or angular force that causes movement of the at least one proof mass and a monitor channel that is based on the self-test signal;
extracting a sense signal associated with the sense channel from the combined signal based on a frequency of drive signal;
extracting a monitor signal associated with the monitor channel based on a CDMA code associated with the self-test signal;
quantifying the inertial linear or angular force based on the sense signal; and
determining the error for the MEMS inertial sensor based on the monitor signal.

16. The method of claim 15, wherein the self-test signal comprises the CDMA code modulated by a periodic signal.

17. The method of claim 15, wherein extracting the sense signal comprises filtering the combined signal with a filter suitable to remove the monitor signal from the combined signal.

18. The method of claim 15, wherein extracting the sense signal comprises averaging the combined signal over a time interval T and then downsampling at a rate 1/T.

19. The method of claim 15, wherein extracting the monitor signal comprises correlating the combined signal with a delayed version of the CDMA code.

20. The method of claim 15, further comprising:
comparing the error to a threshold; and
generating a warning based on the comparison.

21. The method of claim 15, further comprising:
determining a difference between the error and a prior measurement of the error;
comparing the difference to a threshold; and
generating a warning when the difference exceeds the threshold.

22. The method of claim 15, further comprising:
determining a rate of change of the error;
comparing the rate of change to a threshold; and
generating a warning when the rate of change exceeds the threshold.

23. The method of claim 15, wherein the self-test signal is also modulated based on a spreading sequence.

24. The method of claim 15, wherein the error comprises a sensitivity error.

25. The method of claim 15, wherein the error comprises an offset error.

* * * * *